US009708526B2

(12) United States Patent
Coates

(10) Patent No.: US 9,708,526 B2
(45) Date of Patent: Jul. 18, 2017

(54) METHODS FOR PRODUCING AUTHIGENIC ROCK MINERAL FOR ALTERING ROCK HYDROLOGY

(71) Applicant: The Regents of the University of California, Oakland, CA (US)

(72) Inventor: John D. Coates, Walnut Creek, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 221 days.

(21) Appl. No.: 14/353,267

(22) PCT Filed: Oct. 24, 2012

(86) PCT No.: PCT/US2012/061638
§ 371 (c)(1),
(2) Date: Apr. 21, 2014

(87) PCT Pub. No.: WO2013/063077
PCT Pub. Date: May 2, 2013

(65) Prior Publication Data
US 2014/0251622 A1    Sep. 11, 2014

Related U.S. Application Data

(60) Provisional application No. 61/550,867, filed on Oct. 24, 2011.

(51) Int. Cl.
*E21B 43/16* (2006.01)
*C09K 8/582* (2006.01)

(52) U.S. Cl.
CPC .............. *C09K 8/582* (2013.01); *E21B 43/16* (2013.01)

(58) Field of Classification Search
CPC .................................. C09K 8/582; C09K 8/514
See application file for complete search history.

(56) References Cited

U.S. PATENT DOCUMENTS

| 2,807,570 | A | * | 9/1957 | Updegraff | C09K 8/905 166/246 |
| 3,118,500 | A | * | 1/1964 | Maddox, Jr. | C09K 8/60 166/246 |
| 3,730,272 | A | * | 5/1973 | Richardson | E21B 21/003 166/294 |
| 4,460,043 | A | | 7/1984 | Thompson et al. | |
| 4,558,739 | A | * | 12/1985 | McInerney | B09C 1/00 166/246 |
| 4,561,500 | A | | 12/1985 | Thompson et al. | |
| 4,799,454 | A | | 1/1989 | Ito | |
| 4,799,545 | A | | 1/1989 | Silver et al. | |
| 5,143,155 | A | * | 9/1992 | Ferris | C09K 8/905 166/246 |
| 5,337,820 | A | | 8/1994 | Jenneman et al. | |
| 6,244,346 | B1 | * | 6/2001 | Perriello | C09K 8/52 166/246 |
| 6,758,270 | B1 | * | 7/2004 | Sunde | C09K 8/905 166/246 |
| 8,254,994 | B2 | * | 8/2012 | Yang | H01Q 1/2275 455/347 |
| 2006/0151171 | A1 | * | 7/2006 | Davies | C09K 8/572 166/294 |
| 2007/0092930 | A1 | * | 4/2007 | Lal | C09K 8/582 435/41 |
| 2013/0075085 | A1 | * | 3/2013 | Fallon | C09K 8/582 166/246 |

OTHER PUBLICATIONS

Lane et al., "Evolutionary Relationships among Sulfur- and Iron-Oxidizing Eubacteria," Jan. 1992, Journal of Bacteriology, vol. 174, No. 1, p. 269-278.*
International Search Report and Written Opinion received for PCT Patent Application No. PCT/US2012/061638, mailed on Feb. 15, 2013, 12 pages.
Lack et al., "Immobilization of Radionuclides and Heavy Metals through Anaerobic Bio-Oxidation of Fe(II)", Applied and Environmental Microbiology, vol. 68, No. 6, Jun. 2002, pp. 2704-2710.
Straub et al., "Anaerobic, Nitrate-Dependent Microbial Oxidation of Ferrous Iron", Applied and Environmental Microbiology, vol. 62, No. 4, Apr. 1996, pp. 1458-1460.
Weber et al., "Microorganisms Pumping Iron: Anaerobic Microbial Iron Oxidation and Reduction", Nature Reviews Microbiology, vol. 4, Oct. 2006, pp. 752-764.
International Preliminary Report on Patentability received for PCT Patent Application No. PCT/US2012/061638, mailed on May 8, 2014, 10 pages.
Bruce et al., "Reduction of (Per) chlorate by a Novel Organism Isolated from Paper Mill Waste", Environmental Microbiology, vol. 1, No. 4, 1999, pp. 319-329.
Buresh et al., "Chemical Reduction of Nitrate by Ferrous Iron", Journal Environmental Qual, vol. 5, No. 3, Jul. 1976, pp. 320-325.
Chaudhuri et al., "Biogenic Magnetite Formation through Anaerobic Biooxidation of Fe (II)", Applied Environmental Microbiology, vol. 67, No. 6, Jun. 2001, pp. 2844-2848.
Coates et al., "Microbial Perchlorate Reduction: Rocket-Fuelled Metabolism", Nature Reviews Microbiology, vol. 2, Jul. 2004, pp. 569-580.
Coates et al., "Ubiquity and Diversity of Dissimilatory (Per) Chlorate-Reducing Bacteria", Applied and Environmental Microbiology, vol. 65, No. 12, Dec. 1999, pp. 5234-5241.
Davison et al., "The Kinetics of the Oxidation of Ferrous Iron in Synthetic and Natural Waters", Geochimica et Cosmochimica Acta, vol. 47, 1983, pp. 67-79.
Emerson et al., "Bacterial Iron Oxidation in Circumneutral Freshwater Habitats: Findings from the Field and the Laboratory", Geomicrobiology Journal, vol. 21, 2004, pp. 405-414.
Emerson et al., "Isolation and Characterization of Novel Iron-Oxidizing Bacteria that Grow at Circumneutral pH", Applied Environmental Microbiology, vol. 63, No. 12, Dec. 1997, pp. 4784-4792.
Hansen et al., "Abiotic Nitrate Reduction to Ammonium: Key Role of Green Rust", Environmental Science and Technology, vol. 30, No. 6, 1996, pp. 2053-2056.

(Continued)

*Primary Examiner* — Angela M DiTrani
(74) *Attorney, Agent, or Firm* — Morrison & Foerster LLP

(57) ABSTRACT

Methods of reversibly altering the rock hydrology in systems, such as oil reservoirs, by inducing authigenic mineral-precipitating bacteria to produce authigenic rock mineral.

19 Claims, 9 Drawing Sheets

(56) References Cited

OTHER PUBLICATIONS

Kluber et al., "Effects of Nitrate, Nitrite, NO and N2O on Methanogenesis and other Redox Processes in Anoxic Rice Field Soil", FEMS Microbiology Ecology, vol. 25, 1998, pp. 301-318.
Lack et al., "Anaerobic Biooxidation of Fe (II) by Dechlorosoma Suillum", Microbial Ecology, vol. 43, 2002, pp. 424-431.
Lovley et al., "Dissimilatory Fe (III) and Mn (IV) Reduction", Advances in Microbial Physiology, vol. 49, 2004, pp. 219-286.
Nealson et al., "Iron and Manganese in Anaerobic Respiration: Environmental Significance, Physiology, and Regulation", Annual Review Microbiology, vol. 48, 1994, pp. 311-343.
Ottley et al., "Chemical Catalysis of Nitrate Reduction by Iron (II)", Geochimica et Cosmochimica Acta, vol. 61, No. 9, 1997, pp. 1819-1828.
Postma, Dieke, "Kinetics of Nitrate Reduction by Detrital Fe (II)-Silicates", Geochimica et Cosmochimica Acta, vol. 54, 1990, pp. 903-908.
Raiders et al., "Microbial Selective Plugging and Enhanced Oil Recovery", Journal of Industrial Microbiology, vol. 4, 1989, pp. 215-229.
Roden et al., "Potential for Microscale Bacterial Fe Redox Cycling at the Aerobic-Anaerobic Interface", Geomicrobiology Journal, vol. 21, 2004, pp. 379-391.
Senko et al., "Effect of Oxidation Rate and Fe (II) State on Microbial Nitrate-Dependent Fe (III) Mineral Formation", Applied Environmental Microbiology, vol. 71, No. 11, Nov. 2005, pp. 7172-7177.
Senn et al., "Nitrate Controls on Iron and Arsenic in an Urban Lake", Science, vol. 296, Jun. 28, 2002, pp. 2373-2376.
Shelobolina et al., "Fe-Cycle Bacteria From Industrial Clays Mined in Georgia, USA", Clays and Clay Minerals, vol. 53, No. 6, 2005, pp. 580-586.
Shelobolina et al., "Use of Ferric and Ferrous Iron Containing Minerals for Respiration by Desulfitobacterium Frappieri", Geomicrobiology, Journal, vol. 20, 2003, pp. 143-156.
Sobolev et al., "Evidence for Rapid Microscale Bacterial Redox Cycling of Iron In Circumneutral Environments", Antonie Van Leeuwenhoek, vol. 81, 2002, pp. 587-597.
Sobolev et al., "Suboxic Deposition if Ferric Iron by Bacteria in Opposing Gradients of Fe (II) and Oxygen at Circumneutral pH", Applied and Environmental Microbiology, vol. 67, No. 3, Mar. 2001, pp. 1328-1334.
Sorensen et al., "Stimulation by Lepidocrocite (γ-FeOOH) of Fe (II)-Dependent Nitrite Reduction", Geochimica et Cosmochimica Acta, vol. 55, 1991, pp. 1289-1294.
Straub, "Diversity of Ferrous Iron-Oxidizing, Nitrate-Reducing Bacteria and their Involvement in Oxygen-Independent Iron Cycling", Geomicrobiology Journal, vol. 21, Mar. 2004, pp. 371-378.
Stumm et al., "The Cycling of Iron in Natural Environments: Considerations based on Laboratory Studies of Heterogeneous Redox Processes", Geochimica et Cosmochimica Acta, vol. 56, 1992, pp. 3233-3257.
Van Heeke et al., "Chemo-Denitrification of Nitrate-Polluted Water", Environmental Pollution, vol. 63, 1990, pp. 261-274.
Weber et al., "Anaerobic Redox Cycling of Iron by Freshwater Sediment Microorganisms", Environmental Microbiology, vol. 8, No. 1, 2006, pp. 100-113.
Weber et al., "Microbially Catalyzed Nitrate-Dependent Oxidation of Biogenic Solid-Phase Fe(II) Compounds", Environmental Science and Technology, vol. 35, No. 8, Mar. 20, 2001, pp. 1644-1650.
Widdel et al., "Ferrous Iron Oxidation by Anoxygenic Phototrophic Bacteria", Nature, vol. 362, Apr. 29, 1993, pp. 834-836.
Office Action Received for Mexican Patent Application No. MX/a/2014/004680, mailed on Jul. 28, 2015, 4 pages (2 Pages of English Translation).
Office Action received for Chinese Patent Application No. 201280052385.5, mailed on Feb. 23, 2016, 13 pages (7 Pages of English Translation).

* cited by examiner

METHODS FOR PRODUCING AUTHIGENIC ROCK MINERAL FOR ALTERING ROCK HYDROLOGY

CROSS-REFERENCE TO RELATED APPLICATIONS

This application is a U.S. National Phase patent application of PCT/US2012/061638, filed Oct. 24, 2012, which claims the benefit of U.S. Provisional Application No. 61/550,867, filed Oct. 24, 2011, which are hereby incorporated by reference, in their entireties. This application claims the benefit of U.S. Provisional Application No. 61/550,867, filed Oct. 24, 2011, which is hereby incorporated by reference, in its entirety.

STATEMENT AS TO RIGHTS TO INVENTIONS MADE UNDER FEDERALLY SPONSORED RESEARCH OR DEVELOPMENT

This invention was made with government support under awarded Contract No. DE-FG02-98ER62689, awarded by the United States Department of Energy to The University of California at Berkeley. The government has certain rights in this invention.

FIELD OF THE INVENTION

The present disclosure relates to methods of reversibly altering the rock hydrology in systems, such as oil reservoirs, by inducing the reversible production of authigenic rock mineral by authigenic mineral-precipitating bacteria.

BACKGROUND OF THE INVENTION

In the recovery of oil from oil-bearing reservoirs, it is often possible to recover only a portion of the oil contained in the underground formation by the so-called primary recovery methods which utilize the natural forces present in the reservoir. Exceptionally poor oil recovery can be due to a number of factors including the breakthrough of an overlying gas body or an edge or bottom water to the production well by coning or channeling. This is particularly evident where reservoir heterogeneities such as fractures or high permeability streaks are selectively depleted of oil allowing the premature entry of adjacent gas or water into the production zone. In heavy oil fields, the relatively low viscosity and high mobility of a water phase allows such breakthrough even in homogeneous reservoirs by channeling or fingering of the water through the relatively immobile oil phase. Once highly water permeable channels are established, heavy oil production is lost.

A variety of enhanced recovery techniques (e.g., secondary and tertiary recovery) have been employed in order to increase the recovery of oil from subterranean reservoirs. In one form of enhanced recovery of oil, a drive fluid is injected under pressure into the oil reservoir through one or more injection wells to maintain, restore or produce formation pressure. The most widely used drive fluid is water, however, more complex aqueous systems, solvents and gases are also useful as drive fluids. Steam is often employed for heavy oils. The drive fluid is frequently introduced into the oil-bearing underground formation near the bottom of the formation at or above formation pressure, to displace oil in the reservoir. As the fluid moves through the reservoir, it drives or flushes the oil through the formation. An increased oil saturation develops ahead of the moving fluid and finally reaches the production well or wells.

Generally, an oil-bearing underground formation will consist of various regions having different permeabilities. Drive fluid moving through the reservoir preferentially moves to and through regions of higher permeability, fractures and the like. Drive fluids will pass predominantly through such channels bypassing regions of lower permeability and, thus, bypass oil contained in such lower permeability regions, thus reducing the sweep efficiency of the displacing medium.

Prior art techniques for homogenizing permeability, and thus increasing sweep efficiency, often require the injection of noxious chemicals and/or polymers.

Additionally, the problems associated with enhanced oil recovery can be particularly acute when the oil is the highly viscous, so-called "heavy oil" which exists in the Lloydminster region in Canada and in certain reservoirs located in Alaska and Venezuela. In such heavy oil reservoirs, primary recovery and conventional water flooding operations are sometimes estimated to produce as little as 4% to 8% of the oil contained in the reservoir.

Moreover, while U.S. Pat. Nos. 4,460,043; 4,561,500; and 5,143,155 disclose that oil production may be enhanced through the application of a selective microbial plugging system, these microbial plugs are susceptible to damage caused by high velocity fluid flows or large pressure drops across the plug, by thermal degradation in steam drive situations and the like, and by the degradation of biological plugging materials by the indigenous microbial population. Furthermore, such plugs may not be easily removed. Once the oil in the low permeability channel is expressed, this results in increased backpressure at the injection well-head that increases the risk of permanent plugging of the local environment around injection well and unpredictable fracturing of the reservoir stratum.

Accordingly, there exists a need for improved methods of enhanced oil recovery that homogenize the reservoir permeability, which result in a significant improvement in oil recovery regardless of oil viscosity and/or characteristics (i.e., both light and heavy oil); that are not susceptible to thermal damage or break down as a result of large pressure drops across the plug; that are not susceptible to either biological or chemical degradation by the indigenous microbial population; and that reversible so as to allow for the sequential expansion of the permeability homogenizing effect out into the reservoir matrix to maintain increased sweep efficiency without risk to the reservoir integrity.

BRIEF SUMMARY

In order to meet the above needs, the present disclosure provides novel methods of reversibly precipitating authigenic rock minerals for altering rock hydrology, reducing the drop in water pressure of floodwater in oil recovery, and increasing oil recovery from an oil reservoir, by providing a composition containing an authigenic mineral precursor solution and an authigenic mineral-precipitation inducer, and adding the composition to a system containing a rock matrix and authigenic mineral-precipitating bacteria under conditions whereby the inducer induces the bacteria to reversibly precipitate authigenic mineral from the solution into the rock matrix. Advantageously, the methods of the present disclosure utilize authigenic mineral-precipitating bacteria that are ubiquitous and active in the disclosed systems, such as oil reservoirs. Moreover, the methods of the present disclosure advantageously utilize the reversibility of the bacterial-mediated authigenic rock mineral precipitation to increase floodwater sweep efficiency by continuously creating low permeability channels. The reversibility of the authigenic rock mineral precipitation allows the dissolution of the created channels and redirection of floodwaters. New low permeability channels can then be created by inducing the bacteria to precipitate authigenic rock mineral in a different region of the system to maintain the increased floodwater sweep efficiency.

Accordingly, certain aspects of the present disclosure relate to a method of increasing oil recovery from an oil reservoir by reversibly precipitating authigenic rock mineral, by: a) providing an oil reservoir system containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, wherein the precipitated authigenic mineral alters floodwater hydrology, thereby increasing oil recovery.

Other aspects of the present disclosure relate to a method of reversibly precipitating authigenic rock mineral, the method by: a) providing a system containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix.

Other aspects of the present disclosure relate to a method of altering rock hydrology by reversibly precipitating authigenic rock mineral, the method, by: a) providing a system containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, wherein the precipitated authigenic mineral alters rock hydrology.

Yet other aspects of the present disclosure relate to a method of reducing the drop in water pressure of floodwater in oil recovery by reversibly precipitating authigenic rock mineral, by: a) providing a system containing a rock matrix, floodwater, and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, wherein the precipitated authigenic mineral reduces the drop in water pressure of floodwater.

In certain embodiments of any of the above methods, the system is an oil reservoir.

In certain embodiments of any of the above methods, the system further contains a ground contaminant. In some embodiments, the ground contaminant is selected from radioactive pollution, radioactive waste, heavy metals, halogenated solvents, pesticides, herbicides, and dyes.

Other aspects of the present disclosure relate to a method of forming a barrier by reversibly precipitating authigenic rock mineral, by: a) providing a system containing a rock matrix, rock matrix materials, and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral forms a barrier, and where the barrier reduces the flow of the rock materials through the rock matrix. In some embodiments, the rock materials contain $CO_2$. In other embodiments, the rock materials contain one or more contaminants. Preferably, the one or more contaminants are selected from radioactive pollution, radioactive waste, heavy metals, halogenated solvents, pesticides, herbicides, and dyes.

In certain embodiments of any of the above methods, prior to step a), the authigenic mineral-precipitating bacteria are added to the system. In certain embodiments of any of the above methods, the authigenic mineral-precipitating bacteria are selected from iron-reducing bacteria, iron-oxidizing bacteria, nitrate-dependent Fe(II)-oxidizing bacteria, fermentative bacteria, phosphite-oxidizing bacteria, perchlorate-reducing bacteria, chlorate-reducing bacteria, and nitrate-reducing bacteria. In other embodiments of any of the above methods, the authigenic mineral-precipitating bacteria are iron-oxidizing bacteria or nitrate-dependent Fe(II)-oxidizing bacteria.

In still other embodiments of any of the above methods, the authigenic mineral precursor solution is selected from an Fe (II) solution, an Fe(III) solution, a noble iron nanoparticle solution, an ammonia solution, a phosphate solution, a phosphite solution, a calcium solution, a carbonate solution, a magnesium solution, and a silicate solution. Preferably, the authigenic mineral precursor solution is an Fe(II) solution. In further embodiments of any of the above methods, the authigenic mineral-precipitation inducer is selected from nitrate, nitrite, nitrous oxide, nitric oxide, perchlorate, chlorate, chlorite, chlorine dioxide, Fe(III), carbonate, and oxygen. Preferably, the authigenic mineral-precipitation inducer is nitrate.

In some embodiments of any of the above methods, the authigenic mineral precipitation is the result of a reversible reaction. In certain embodiments, the reversible reaction is a redox reaction. In other embodiments of any of the above methods, the precipitated authigenic mineral is dissolved by reversing the authigenic mineral precipitation reaction.

In other embodiments of any of the above methods, the system further contains authigenic mineral-dissolving bacteria. In certain embodiments, the system is contacted with an authigenic mineral-dissolving inducer under conditions whereby the authigenic mineral-dissolving inducer induces the authigenic mineral-dissolving bacteria to dissolve the precipitated authigenic mineral. In other embodiments, the authigenic mineral-dissolving inducer is selected from nitrate, nitrite, nitrous oxide, nitric oxide, perchlorate, chlorate, chlorite, chlorine dioxide, Fe(III), carbonate, phosphate, phosphite, oxygen, H2, acetate, propionate, butyrate, lactate, benzoate, citrate, hexose, and phosphate. In yet other embodiments of any of the above methods, the authigenic mineral-dissolving bacteria dissolve the precipitated authigenic mineral by reversing the authigenic mineral precipitation reaction. In further embodiments of any of the above methods, the method further includes adding authigenic mineral-dissolving bacteria to the system. In certain preferred embodiments, the added authigenic mineral-dissolving bacteria are recombinant bacteria. In other embodiments of any of the above methods, the authigenic mineral-dissolving bacteria are selected from iron-reducing bacteria, phosphite-reducing bacteria, perchlorate-reducing bacteria, chlorate-reducing bacteria, nitrate-reducing bacteria, and acid-producing bacteria. Preferably, the authigenic mineral-dissolving bacteria are iron-reducing bacteria.

In some embodiments of any of the above methods, the method further includes adding authigenic mineral-precipitating bacteria to the system. In certain embodiments, the added authigenic mineral-precipitating bacteria are recombinant bacteria.

BRIEF DESCRIPTION OF THE DRAWINGS

FIG. 9A shows *Pseudogulbenkiania* strain 2002. FIG. 9B shows *Diaphorobacter* strain TPSY.

DETAILED DESCRIPTION

Definitions

Figure 1:
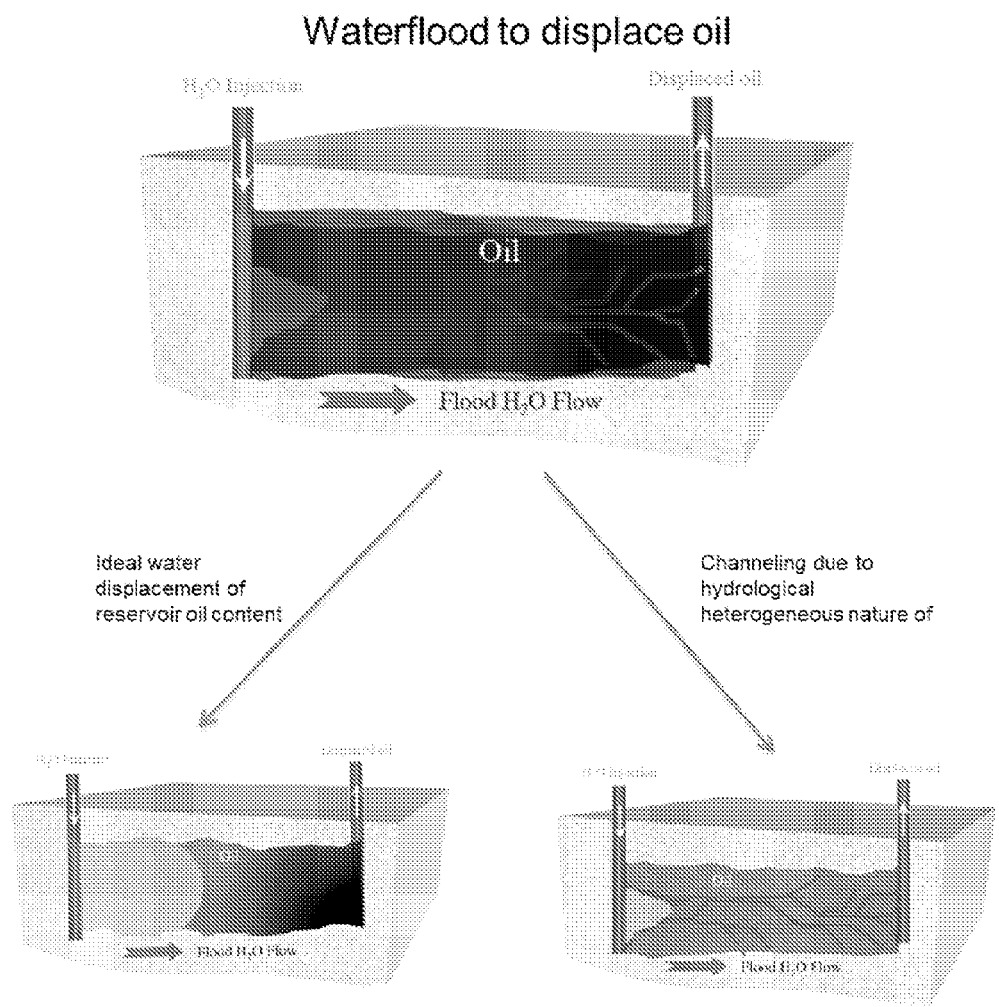
FIG. 1 diagrammatically depicts tertiary oil recovery from an oil reservoir by injecting water via an injection well into an oil reservoir to maintain reservoir pressure and to sweep oil from the injection well towards a production well.

As used herein, "authigenic mineral", "authigenic rock mineral", and "sedimentary rock" are used interchangeably and refer to mineral deposits that develop from soluble chemicals (e.g., ions and organic compounds) in sediments.

As used herein, "authigenic mineral-precipitating bacteria" refers to bacteria that are able to utilize an authigenic mineral precursor solution to precipitate an authigenic mineral. For example, nitrate-dependent Fe(II)-oxidizing bacteria are a type of "authigenic mineral-precipitating bacteria" that oxidize soluble Fe(II) to Fe(III) precipitates.

As used herein, an "authigenic mineral precursor solution" refers to a solution that contains the substrate, such as soluble ions, that is used by authigenic mineral-precipitating bacteria to form a mineral precipitate. For example, an Fe(II) solution may be utilized by nitrogen-dependent Fe(II)-oxidizing bacteria to convert soluble Fe(II) to an Fe(III) precipitate.

As used herein, an "authigenic mineral-precipitation inducer" refers to a composition, for example, a chemical, ionic salt, electron donor, electron acceptor, redox reagent, etc., that induces, in the authigenic mineral-precipitating bacteria, a reversible authigenic mineral-precipitating reaction. For example, an authigenic mineral-precipitation inducer may be an oxidizing agent (i.e., an electron acceptor) that allows the bacteria to precipitate an authigenic mineral from an authigenic mineral precursor solution by oxidizing the precursor solution.

As used herein, "authigenic mineral-dissolving bacteria" refers to bacteria that are able to dissolve authigenic minerals by reversing the authigenic mineral-precipitation reaction induced by authigenic mineral-precipitating bacteria to precipitate an authigenic mineral. For example, authigenic mineral-dissolving bacteria may reduce a component of an authigenic mineral rock, which solubilizes the mineral (e.g., Fe(III)-reducing bacteria convert insoluble Fe(III) into soluble Fe(II)).

As used herein an "authigenic mineral-dissolving inducer" refers to a composition, for example, a chemical, ionic salt, electron donor, electron acceptor, redox reagent, etc., that induces, in the authigenic mineral-dissolving bacteria, the reverse reaction of an authigenic mineral-precipitating reaction. For example, an authigenic mineral-dissolving inducer may be a reducing agent (i.e., an electron donor) that allows the bacteria to solubilize an authigenic mineral precipitate by reducing a component of the precipitate, such as acetate.

As used herein "reversibly precipitating authigenic rock mineral" refers to authigenic rock mineral that can be precipitated and subsequently dissolved and/or solubilized. Preferably, the authigenic rock mineral is precipitated by authigenic mineral-precipitating bacteria of the present disclosure. Generally, the precipitated authigenic rock mineral may be dissolved and/or solubilized by reversing the reaction that lead to the formation of the authigenic rock mineral. For example, the precipitated authigenic rock mineral may be dissolved and/or solubilized by authigenic mineral-dissolving bacteria of the present disclosure.

Overview

The following description sets forth exemplary methods, parameters and the like. It should be recognized, however, that such description is not intended as a limitation on the scope of the present disclosure but is instead provided as a description of exemplary embodiments.

The injection of water into an oil reservoir via one or more injection wells is a commonplace practice to increase oil production beyond primary production yields by maintaining reservoir pressure and sweeping oil from the injection wells towards the production wells (FIG. 1). However, over time floodwater sweep efficiency decreases as floodwater pressure drops. This drop in pressure is the result of increased permeability of the channel carrying the floodwater. The present disclosure relates to methods of increasing floodwater sweep efficiency in rock matrix-containing systems, such as oil reservoirs, in order to increase oil recovery. The methods of the present disclosure achieve increased floodwater sweep by utilizing authigenic mineral-precipitating bacteria to alter the authigenic rock hydrology in the systems. By inducing the authigenic mineral-precipitating activity of these bacteria, the precipitated authigenic mineral plugs high permeability water channels in rock matrix-containing systems, which leads to a more homogeneous flow matrix in the reservoir that results in increased sweep efficiency. This increased sweep efficiency increases oil recovery. Advantageously, when the newly flooded channels are depleted of oil (i.e., the channels become washed out), the authigenic mineral can be dissolved by inducing the activity of authigenic mineral-dissolving bacteria to reverse the authigenic-precipitating reaction induced by the authigenic-precipitating bacteria. In this way, increased floodwater sweep efficiency can be maintained by continuously redirecting flood waters into zones of low permeability throughout the reservoir matrix.

Moreover, the present disclosure is based, at least in part, on the novel discovery that authigenic rock mineral precipitates produced by nitrate-dependent Fe(II)-oxidizing bacteria, which can form solid-phase iron minerals from the metabolism of soluble $Fe^{2+}$ (Lack, J G et al., *Appl. Environ. Microbiol.* 68, 2704-2710, 2002); and Weber, K A et al., *Nat Rev Micro* 4, 752-764, 2006), can be used to alter rock hydrology and improve floodwater sweep efficiency during tertiary oil recovery. These microorganisms are capable of changing the valence state of added soluble ferrous iron [Fe(II)], precipitating out insoluble ferric minerals [Fe(III)], resulting in pore restrictions and reduced pore throat diameter that lead to the formation of low permeability channels. Alternatively, Fe(II) oxidizing organisms can also oxidize the Fe(II) content of native mineral phase Fe(II) in rock matrices thus altering the original mineral structure resulting in rock weathering and mineral biogenesis. Advantageously, authigenic mineral-precipitating bacteria are ubiquitous on earth, and are active in both moderate and extreme environments. Moreover, the authigenic mineral-precipitating activity of these bacteria may be utilized by adding an authigenic mineral precursor solution and an authigenic mineral-precipitation inducer to the floodwater during tertiary oil recovery.

Accordingly, the present disclosure provides methods of reversibly precipitating authigenic rock mineral, by a) providing a system containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix.

The present disclosure also provides methods of altering rock hydrology reversibly precipitating authigenic rock mineral, by a) providing a system containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral alters rock hydrology.

The present disclosure further provides methods of reducing the drop in water pressure of floodwater in oil recovery by reversibly precipitating authigenic rock mineral, by a) providing a system containing a rock matrix, floodwater, and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral reduces the drop in water pressure of floodwater.

The present disclosure also provides methods of increasing oil recovery from an oil reservoir by reversibly precipitating authigenic rock mineral, by a) providing an oil reservoir system containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral alters floodwater hydrology, thereby increasing oil recovery.

The present disclosure further provides methods of forming a barrier by reversibly precipitating authigenic rock mineral, by: a) providing a system containing a rock matrix, rock matrix materials, and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral forms a barrier, and where the barrier reduces the flow of the rock materials through the rock matrix.

Authigenic Mineral-Precipitating Bacteria

Certain aspects of the present disclosure relate to methods of reversibly precipitating authigenic rock mineral by inducing authigenic mineral-precipitating bacteria that are present in systems containing rock matrix to reversibly precipitate authigenic mineral into a rock matrix. Examples of systems containing rock matrix include, without limitation, oil reservoirs, oil fields, aquifers, and subsurface geological formations.

Authigenic mineral-precipitating bacteria that are suitable for use with the methods of the present disclosure include both archaebacteria and eubacteria. Suitable authigenic mineral-precipitating bacteria also include aerobic bacteria and anaerobic bacteria that are be physchrophilic, mesophilic, thermophilic, halophic, halotolerant, acidophilic, alkalophilic, barophilic, barotolerant, or a mixture of several or all of these and intermediates thereof. Preferably, authigenic mineral-precipitating bacteria of the present disclosure are anaerobic bacteria, as anaerobic bacteria have suitable tolerance for the restricted availability of oxygen, extreme temperatures, extreme pH values, and salinity that may be encountered in the subsurface environments of the rock matrix-containing systems of the present disclosure.

Moreover, it has been previously shown that mineral-precipitating bacteria are ubiquitous and active in various environments, such as aquatic environments, terrestrial environments, and subsurface environments. Accordingly, authigenic mineral-precipitating bacteria of the present disclosure are able to sustain the metabolic activity that results in authigenic mineral precipitation in the subsurface environments of rock matrix-containing systems of the present disclosure.

Other examples of suitable authigenic mineral-precipitating bacteria include, without limitation, iron-precipitating bacteria, phosphorous mineral-precipitating bacteria, calcium mineral-precipitating bacteria, apatite mineral mineral-precipitating bacteria, and ammonium carbonate mineral-precipitating bacteria, magnesium mineral-precipitating bacteria, and silicate mineral-precipitating bacteria, manganese mineral-precipitating bacteria, and sulfur mineral-precipitating bacteria. Examples of such bacteria include, without limitation, Proteobacterial species, *Escherichia* species, *Roseobacter* species, *Acidovorax* species, *Thiobacillus* species, *Pseudogulbenkiania* species, *Pseudomonas* species, *Dechloromonas* species, *Azospira* species, *Geobacter* species, *Desulfotignum* species, *Shewanella* species, *Rhodanobacter* species, *Thermomonas* species, *Aquabacterium* species, *Comamonas* species, *Azoarcus* species, *Dechlorobacter* species, *Propionivibrio* species, *Magnetospirillum* species, *Parvibaculm* species, *Paracoccus* species, Firmicutal species, *Desulfitobacterium* species, *Sporosarcina* species, *Bacillus* species, Acidobacterial species, *Geothrix* species, Archaeal species, and *Ferroglobus* species.

Such mineral-precipitating bacteria precipitate various minerals including, without limitation, calcium carbonate, calcium sulfate (gypsum), magnesium carbonate, ferric oxide, ferric oxyhydroxide (e.g., maghemite, hematite, goethite, etc.), mixed valence iron minerals (e.g., magnetite, green rust, etc.), ferric phosphate, ferric carbonate, manganese oxides and mixed valence manganese minerals (e.g., hausmannite, etc.).

In some embodiments, the authigenic mineral-precipitating bacteria are selected from iron-reducing bacteria, iron-oxidizing bacteria, nitrate-dependent Fe(II)-oxidizing bacteria, fermentative bacteria, phosphite-oxidizing bacteria, perchlorate-reducing bacteria, chlorate-reducing bacteria, and nitrate-reducing bacteria.

Generally, authigenic mineral-precipitating bacteria of the present disclosure utilize authigenic mineral precursor solutions and authigenic mineral-precipitation inducers to induce a reversible reaction that results in authigenic mineral precipitation. In certain embodiments, the reversible reaction is a redox reaction.

The authigenic mineral-precipitating bacteria of the present disclosure may also contain one or more of the following genes: type-b cytochrome genes, type-c cytochrome genes, type-α cytochrome genes, and RuBisCo genes.

In some embodiments of the present disclosure, the authigenic mineral-precipitating bacteria are nitrate-dependent Fe(II)-oxidizing bacteria. Nitrate-dependent Fe(II)-oxidizing bacteria can precipitate solid-phase iron minerals from the metabolism of soluble $Fe^{2+}$, which couples Fe(II) oxidation with nitrate reduction. These bacteria are capable of changing the valence state of added soluble ferrous iron [Fe(II)] precipitating out insoluble ferric minerals [Fe(III)], which results in pore restrictions and reduced pore throat diameter.

Accordingly, in certain embodiments of the methods of the present disclosure, authigenic mineral-precipitating bacteria are nitrate-dependent Fe(II)-oxidizing bacteria that precipitate iron minerals when induced with an Fe(II) solution and nitrate.

Additionally, Fe(II)-oxidizing bacteria can oxidize the Fe(II) content of native mineral phase Fe(II) in rock matrices, thus altering the original mineral structure resulting in rock weathering and mineral biogenesis. For example, Fe(II)-oxidizing bacteria can oxidize Fe(II) associated with structural iron in minerals such as almandine, an iron aluminum silicate, yielding amorphous and crystalline Fe(III) oxide minerals. In some embodiments, Fe(II) oxidation occurs at a pH of about 2.0, 2.5, 3.0, 3.5, 4.0, 4.5, 5.0, 5.5, 6.0, 6.5, 6.6, 6.7, 6.8, 6.9, 7.0, 7.1, 7.2, 7.3, 7.4, 7.5, or higher.

Moreover, in addition to nitrate, iron-oxidizing bacteria may also couple nitrite, nitric oxide, nitrous oxide; perchlorate, chlorate, chlorine dioxide, or oxygen reduction with Fe(II) oxidation.

Examples of iron-oxidizing bacteria that may be found in rock matrix-containing systems of the present disclosure include, without limitation, *Chlorobium ferrooxidans*, *Rhodovulum robiginosum*, *Rhodomicrobium vannielii*, *Thiodiction* sp., *Rhodopseudomonas palustris*, *Rhodovulum* sp., *Geobacter metallireducens*, *Diaphorobacter* sp. strain TPSY and *Pseudogulbenkiania* sp. strain 2002, *Dechloromonas* sp., *Dechloromonas aromatica*, *Dechloromonas agitata*, *Azospira* sp., and *Azospira suillum*.

Iron-oxidizing bacteria of the present disclosure can precipitate various iron minerals. Examples of such iron minerals include, without limitation, iron hydr(oxide)s; iron carbonates; Fe(III)-oxides, such as 2-line ferrihydrite, goethite, lepidocrocite, and hematite; and mixed-valence iron minerals, such as green rust, maghemite, magnetite, vivianite, almandine, arsenopyrite, chromite, siderite, and staurolite.

Fe(II)-oxidizing bacteria of the present disclosure may also oxidize solid phase Fe(II), including, without limitation, surface-bound Fe(II), crystalline Fe(II) minerals (siderite, magnetite, pyrite, arsenopyrite and chromite), and structural Fe(II) in nesosilicate (almandine and staurolite) and phyllosilicate (nontronite). This reversible oxidative transformation of solid phase Fe(II) in an anoxic environment provides an additional mechanism for rock weathering for altering authigenic rock hydrology.

Additionally, the iron minerals precipitated by Fe(II)-oxidizing bacteria may also be used as a sink for heavy metals, metalloids, and radionuclides in sedimentary environments, and can regulate soluble metal concentrations, including those of uranium, chromium, and cobalt, in natural waters through adsorption and co-precipitation.

Accordingly, in certain embodiments, the authigenic mineral-precipitating bacteria of the present disclosure may be used to protect ground water aquifers from a contaminant by providing an authigenic mineral barrier that separates the aquifer from the contaminant. In other embodiments, Fe(II)-oxidizing bacteria may be utilized to remediate ground heavy metal contaminants, by precipitating iron oxides that adsorb and immobilize the heavy metals.

Exogenously Added Authigenic Mineral-Precipitating Bacteria

The methods of the present disclosure may utilize authigenic mineral-precipitating bacteria that are indigenous to the rock matrix-containing systems of the present disclosure. However, in systems where the indigenous population of authigenic mineral-precipitating bacteria is not sufficient to be utilized in the methods of the present disclosure, exogenous authigenic mineral-precipitating bacteria may be added to the system. For example, exogenous authigenic mineral-precipitating bacteria may be introduced into the subsurface rock matrix of an oil reservoir by adding a culture broth containing the exogenous authigenic mineral-precipitating bacteria into the injection well of an oil reservoir. Culturing media and methods of culturing bacteria are well known in the art. Suitable authigenic mineral-precipitating bacteria that may be exogenously added include any of the authigenic mineral-precipitating bacteria disclosed herein. Accordingly, in certain embodiments of any of the methods of the present disclosure, prior to providing a system, such as an oil reservoir, containing a rock matrix and authigenic mineral-precipitating bacteria, the authigenic mineral-precipitating bacteria are added to the system.

In other embodiments, exogenously added authigenic mineral-precipitating bacteria may be isolated from a broad diversity of environments including aquatic environments, terrestrial environments, and subsurface environments. Mutants and variants of such isolated authigenic mineral-precipitating bacteria strains (parental strains), which retain authigenic mineral-precipitating activity can also be used in the provided methods. To obtain such mutants, the parental strain may be treated with a chemical such as N-methyl-N'-nitro-N-nitrosoguanidine, ethylmethanesulfone, or by irradiation using gamma, x-ray, or UV-irradiation, or by other means well known to those practiced in the art.

The term "mutant of a strain" as used herein refers to a variant of the parental strain. The parental strain is defined herein as the original isolated strain prior to mutagenesis.

The term "variant of a strain" can be identified as having a genome that hybridizes under conditions of high stringency to the genome of the parental strain. "Hybridization" refers to a reaction in which a genome reacts to form a complex with another genome that is stabilized via hydrogen bonding between the bases of the nucleotide residues that make up the genomes. The hydrogen bonding may occur by Watson-Crick base pairing, Hoogstein binding, or in any other sequence-specific manner. The complex may comprise two strands forming a duplex structure, three or more strands forming a multi-stranded complex, a single self-hybridizing strand, or any combination of these. Hybridization reactions can be performed under conditions of different "stringency." In general, a low stringency hybridization reaction is carried out at about 40° C. in 10×SSC or a solution of equivalent ionic strength/temperature. A moderate stringency hybridization is typically performed at about 50° C. in 6×SSC, and a high stringency hybridization reaction is generally performed at about 60° C. in 1×SSC.

In certain embodiments, the exogenously added authigenic mineral-precipitating bacteria can be modified, e.g., by mutagenesis as described above, to improve or enhance the authigenic mineral-precipitating activity. For instance, Fe(II)-oxidizing bacteria may be modified to enhance expression of endogenous genes which may positively regulate a pathway involved in Fe(II) oxidation. One way of achieving this enhancement is to provide additional exogenous copies of such positive regulator genes. Similarly, negative regulators of the pathway, which are endogenous to the cell, may be removed.

The genes in authigenic mineral-precipitating bacteria encoding proteins involved in authigenic mineral-precipitation may also be optimized for improved authigenic mineral-precipitating activity. As used herein, "optimized" refers to the gene encoding a protein having an altered biological activity, such as by the genetic alteration of the gene such that the encoded protein has improved functional characteristics in relation to the wild-type protein. Methods of optimizing genes are well known in the art, and include, without limitation, introducing point mutations, deletions, or heterologous sequences into the gene.

Accordingly, in certain embodiments, the exogenously added authigenic mineral-precipitating bacteria are recombinant bacteria that may contain at least one modification that improves or enhances the authigenic mineral-precipitating activity of the bacteria.

Authigenic Mineral Precursor Solutions and Authigenic Mineral-Precipitation Inducers Authigenic rock mineral precipitation is produced by authigenic mineral-precipitating bacteria by contacting the bacteria with an authigenic mineral precursor solution and an authigenic mineral-precipitation inducer. In some embodiments, the authigenic mineral precursor solution and the authigenic mineral-precipitation inducer are provided in a single composition. Alternatively, the authigenic mineral precursor solution and the authigenic mineral-precipitation inducer may be provided separately.

In embodiments where the system containing rock matrix is an oil reservoir, the authigenic mineral precursor solution and the authigenic mineral-precipitation inducer may be provided to indigenous authigenic mineral-precipitating bacteria by adding the authigenic mineral precursor solution and the authigenic mineral-precipitation inducer to an injection well.

In embodiments where exogenous authigenic mineral-precipitating bacteria are added to a rock matrix-containing system, the authigenic mineral precursor solution and the authigenic mineral-precipitation inducer may be added to the system concurrently with the bacteria. In other embodiments, the authigenic mineral precursor solution and the authigenic mineral-precipitation inducer are added subsequently to addition of the bacteria.

In other embodiments, the ratio of authigenic mineral precursor solution to authigenic mineral-precipitation inducer that is added to the rock matrix-containing system is at least 2:1, at least 3:1, at least 4:1, at least 5:1, at least 6:1, at least 7:1, at least 8:1, at least 9:1, at least 10:1, or more. In embodiments where the authigenic mineral precursor solution is an Fe(II) solution and the authigenic mineral-precipitation inducer is nitrate, the ratio of Fe(II) solution to nitrate that is added to the rock matrix-containing system is at least 2:1, at least 3:1, at least 4:1, at least 5:1, at least 6:1, at least 7:1, at least 8:1, at least 9:1, at least 10:1, or more. Preferably, the ratio of Fe(II) solution to nitrate that is added to the rock matrix-containing system is 5:1.

Authigenic Mineral Precursor Solutions

As disclosed herein, authigenic mineral precursor solutions provide the substrate that is utilized by the authigenic mineral-precipitating bacteria to produce authigenic mineral. For example, in the case of Fe(II)-oxidizing bacteria, an Fe(II) solution provides the soluble Fe(II) substrate for the formation of iron oxide mineral precipitates.

Authigenic mineral precursor solutions of the present disclosure are provided to authigenic mineral-precipitating bacteria under conditions whereby the bacteria utilize the solution to precipitate authigenic mineral into a rock matrix-containing system of the present disclosure. Generally, the conditions will depend on the type of bacteria present in the rock matrix-containing system, the type of authigenic rock matrix present in the system, and the subsurface conditions of the rock matrix-containing system.

Examples of suitable authigenic mineral precursor solutions include, without limitation, Fe (II) solutions, Fe(III) solutions, noble iron nanoparticle solutions, ammonia solutions, phosphate solutions, phosphite solutions, calcium solutions, carbonate solutions, magnesium solutions, and silicate solution.

Authigenic Mineral-Precipitation Inducers

As disclosed herein, authigenic mineral-precipitation inducers are solutions containing, for example, chemicals, ionic salts, chelators, electron donors, electron acceptors, or redox reagents that induce the authigenic mineral-precipitating activity in the authigenic mineral-precipitating bacteria. For example, in the case of nitrate-dependent Fe(II)-oxidizing bacteria, nitrate can serve as the inducer, as its reduction is coupled to Fe(II) oxidization in the bacteria, which results in the precipitation of Fe(III) oxides.

Authigenic mineral-precipitation inducers of the present disclosure are provided to authigenic mineral-precipitating bacteria under conditions whereby the inducer induces the bacteria to reversibly precipitate authigenic mineral from an authigenic mineral precursor solution into a rock matrix-containing system of the present disclosure. Generally, the conditions will depend on the type of bacteria present in the rock matrix-containing system, the type of authigenic rock matrix present in the system, and the subsurface conditions of the rock matrix-containing system.

Examples of suitable authigenic mineral-precipitation inducers include, without limitation, nitrate, nitrite, nitrous oxide, nitric oxide, perchlorate, chlorate, chlorite, chlorine dioxide, Fe(III), carbonate, and oxygen.

Authigenic Mineral-Dissolving Bacteria

Other aspects of the present disclosure relate to dissolving the authigenic mineral precipitated by authigenic mineral-precipitating bacteria of the present disclosure. Generally, the precipitated authigenic mineral is dissolved by reversing the reaction induced by the authigenic mineral-precipitating bacteria. Preferably, the authigenic mineral precipitating reaction is reversed by authigenic mineral-dissolving bacteria.

As disclosed herein, authigenic mineral-dissolving bacteria contain an authigenic mineral dissolving activity that is mediated by the reverse reaction of the reaction induced by authigenic mineral-precipitating bacteria. The reverse reaction can be induced in authigenic mineral-dissolving bacteria by adding an authigenic mineral-dissolving inducer to the system containing the bacteria. In certain embodiments, the reverse reaction induced by the authigenic mineral-dissolving bacteria is a redox reaction. Accordingly, authigenic mineral-dissolving bacteria of the present disclosure can reverse any authigenic mineral-precipitating reaction induced by authigenic mineral-precipitating bacteria of the present disclosure.

Suitable authigenic mineral-dissolving bacteria include both archaebacteria and eubacteria. Moreover, authigenic mineral-dissolving bacteria may be aerobic bacteria or anaerobic bacteria that are either mesophilic or thermophilic. Additionally, authigenic mineral-dissolving bacteria of the present disclosure are able to sustain the metabolic activity that dissolves authigenic mineral precipitation in the subsurface environments of rock matrix-containing systems of the present disclosure.

Further examples of suitable authigenic mineral-dissolving bacteria include without limitation, bacteria that dissolve iron mineral precipitates, phosphorite mineral precipitates, calcium mineral precipitates, apatite mineral precipitates, ammonium carbonate mineral precipitates, magnesium mineral precipitates, and silicate mineral precipitates. In some embodiments, the authigenic mineral-dissolving bacteria are selected from iron-reducing bacteria, perchlorate-reducing bacteria, chlorate-reducing bacteria, nitrate-reducing bacteria, and acid-producing bacteria.

In some embodiments, the authigenic mineral-dissolving bacteria dissolve authigenic mineral precipitants by producing an acid that sufficiently lowers the pH of the rock matrix-containing system to dissolve the authigenic mineral precipitate. For example, the authigenic mineral precipitate may be dissolved at a pH of about 7.5, 7.0, 6.5, 6.0, 5.5, 5.0, 4.5, 4.0, 3.5, 3.0, 2.5, 2.0, or lower.

Suitable authigenic mineral-dissolving bacteria may include, without limitation, Proteobacterial species, *Escherichia* species, *Shewanella* species, *Geobacter* species, *Desulfovibrio* species, *Desulfuromonas* species, *Pseudomonas* species, *Desulfotignum* species, *Dechlorobacter* species, *Pelobacter* species, Firmicutal species, *Thermincola* species, *Thermoterrabacterium* species, *Thermovenabulum* species, *Thermolithobacter* species, *Thermosinus* species, *Alicyclobacillus* species, *Anaerobranca* species, *Carboxydothermus* species, *Tepidimicrobium* species, *Alkaliphilus* species, *Clostridium* species, *Desulfitobacterium* species, *Desulfosporosinus* species, *Desulfotomaculum* species, *Sulfobacillus* species, *Bacillus* species, *Actinobacterial* species, *Acidimicrobium* species, *Cellulomonas* species, *Ferrithrix* species, *Ferromicrobium* species; Acidobacterial species, *Geothrix* species, Archaeal species, and *Ferroglobus* species.

In one non-limiting example, it has been shown that the Fe(III)-reducing bacteria *Thermincola potens* strain JR can reduce insoluble Fe(III) to soluble Fe(II) (see, Wrighton et al., *Appl. Environ. Microbiol.*, 2011).

In some embodiments, the methods of the present disclosure utilize authigenic mineral-dissolving bacteria that are indigenous to the rock matrix-containing systems of the present disclosure. However, in systems where the indigenous population of authigenic mineral-dissolving bacteria is not sufficient to be utilized in the methods of the present disclosure, exogenous authigenic mineral-dissolving bacteria may be added to the system. For example, exogenous authigenic mineral-dissolving bacteria may be introduced into the subsurface rock matrix of an oil reservoir by adding a culture broth containing the exogenous authigenic mineral-dissolving bacteria into the injection well of an oil reservoir.

In some embodiments authigenic mineral-dissolving bacteria to be added exogenously may be isolated from a broad diversity of environments including aquatic environments, terrestrial environments, and subsurface environments. Mutants and variants of such isolated authigenic mineral-dissolving bacteria strains (parental strains), which retain authigenic mineral-dissolving activity can also be used in the provided methods. To obtain such mutants, the parental strain may be treated with a chemical such as N-methyl-N'-nitro-N-nitrosoguanidine, ethylmethanesulfone, or by irradiation using gamma, x-ray, or UV-irradiation, or by other means well known to those practiced in the art.

In other embodiments, the exogenously added authigenic mineral-dissolving bacteria can be modified, e.g., by mutagenesis as described above, to improve or enhance the authigenic mineral-dissolving activity. For example, iron-reducing bacteria may be modified to enhance expression of endogenous genes which may positively regulate a pathway involved in iron reduction. One way of achieving this enhancement is to provide additional exogenous copies of such positive regulator genes. Similarly, negative regulators of the pathway, which are endogenous to the cell, may be removed. In further embodiments, the genes in authigenic mineral-dissolving bacteria encoding proteins involved in authigenic mineral-dissolution may be optimized for improved authigenic mineral-dissolving activity. Methods of optimizing genes are well known in the art, and include, without limitation, introducing point mutations, deletions, or heterologous sequences into the gene.

In some embodiments, the exogenously added authigenic mineral-dissolving bacteria are recombinant bacteria that may contain at least one modification that improves or enhances the authigenic mineral-dissolving activity of the bacteria.

Authigenic Mineral-Dissolving Inducers

The authigenic mineral-dissolving activity of authigenic mineral-dissolving bacteria is induced by contacting the bacteria with an authigenic mineral-dissolving inducer under conditions whereby the authigenic mineral-dissolving inducer induces the authigenic mineral-dissolving bacteria to dissolve the precipitated authigenic mineral. In embodiments where the system containing rock matrix is an oil reservoir, the authigenic mineral-dissolving inducer may be provided to indigenous authigenic mineral-dissolving bacteria by adding the authigenic mineral-dissolving inducer to the injection well.

In embodiments where exogenous authigenic mineral-dissolving bacteria are added to a rock matrix-containing system, the authigenic mineral-dissolving inducer may be added to the system concurrently with the bacteria. In other embodiments, the authigenic mineral-dissolving inducer is added subsequently to addition of the bacteria.

As disclosed herein, authigenic mineral-dissolving inducers are solutions containing, for example, chemicals, ionic salts, electron donors, electron acceptors, or redox reagents that induce the reverse reaction of an authigenic mineral-precipitating reaction in the authigenic mineral-dissolving bacteria.

Authigenic mineral-dissolving inducers of the present disclosure are provided to authigenic mineral-dissolving bacteria under conditions whereby the authigenic mineral-dissolving inducer induces the authigenic mineral-dissolving bacteria to dissolve the precipitated authigenic mineral in the rock matrix of a rock matrix-containing system of the present disclosure. Generally, the conditions will depend on the type of bacteria present in the rock matrix-containing system, the type of authigenic rock matrix present in the system, and the subsurface conditions of the rock matrix-containing system.

Examples of suitable authigenic mineral-dissolving inducers include, without limitation, nitrate, nitrite, nitrous oxide, nitric oxide, perchlorate, chlorate, chlorite, chlorine dioxide, Fe(III), carbonate, phosphate, phosphite, oxygen, $H_2$, acetate, propionate, butyrate, lactate, benzoate, citrate, hexose, and phosphite.

Uses

The methods of reversibly precipitating authigenic rock mineral of the present disclosure find application in a variety of industrial uses. For example, the disclosed methods of reversibly precipitating authigenic rock mineral find use in altering rock hydrology, altering the drop in water pressure of floodwater in oil recovery, increasing oil recovery from an oil reservoir, forming a barrier in rock matrix, preventing aquifer contamination, and remediation of contaminated aquifers.

Generally, water primarily moves through channels of high porosity and does not penetrate low porosity zones. As such, only a small fraction of the rock matrix is swept. By homogenizing the rock porosity, the flood waters can move through all channels with equal distribution and thus we improve sweep efficiency, which increases oil recovery.

As disclosed herein, indigenous and/or exogenously added authigenic mineral-precipitating bacteria may be utilized to decrease the permeability of floodwater channels by inducing the bacteria to precipitate authigenic mineral, which alters the rock hydrology by homogenizing rock matrix porosity. This homogenized rock matrix porosity results in the formation of low permeability channels that reduce the drop in water pressure and an increase oil recovery by increasing floodwater sweep efficiency.

Accordingly, certain aspects of the present disclosure provide a method of altering rock hydrology by reversibly precipitating authigenic rock mineral, by: a) providing a system containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral alters rock hydrology. In some embodiments, the alteration in rock hydrology occurs at least 12 days, at least 11 days, at least 10 days, at least 9 days, at least 8 days, at least 7 days, at least 6 days, at least 5 days, at least 4 days, at least 2 days, or less after inducing the authigenic mineral-precipitating bacteria.

Other aspects of the present disclosure relate to a method of reducing the drop in water pressure of floodwater in oil recovery by reversibly precipitating authigenic rock mineral, by: a) providing a system containing a rock matrix, floodwater, and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral reduces the drop in water pressure of floodwater. In some embodiments, the reduction in water pressure occurs at least 12 days, at least 11 days, at least 10 days, at least 9 days, at least 8 days, at least 7 days, at least 6 days, at least 5 days, at least 4 days, at least 2 days, or less after inducing the authigenic mineral-precipitating bacteria. In other embodiments, the drop in water pressure is reduced by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 200%, at least 300%, at least 400%, at least 500%, or a higher percentage more as compared to the drop in water pressure floodwater in oil recovery of a system containing a rock matrix, floodwater, and authigenic mineral-precipitating bacteria, where the bacteria are not contacted with a composition containing an authigenic mineral precursor solution and an authigenic mineral-precipitation inducer. In further embodiments, the authigenic mineral precipitation may be reversed by inducing indigenous and/or exogenously added authigenic mineral-dissolving bacteria with an authigenic mineral-dissolving inducer to remove the floodwater channel plug once the drop in water pressure of floodwater begins to increase. The process of inducing authigenic mineral-precipitating bacteria to precipitate authigenic mineral may then be repeated to alter rock hydrology in a different region of the system.

Additionally, the methods of the present disclosure may also be utilized to create authigenic mineral barriers in unconsolidated matrices in systems containing an unconsolidated matrix, such as oil reservoirs, to enhance water flow characteristics and create predictable pressure drop. Accordingly, certain embodiments of the present disclosure provide a method of enhancing water flow in a system containing an unconsolidated matrix by reversibly precipitating authigenic rock mineral, by: a) providing a system containing an unconsolidated matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the unconsolidated matrix, where the precipitated authigenic mineral alters floodwater hydrology, enhancing water flow.

Further aspects of the present disclosure relate to a method of increasing oil recovery from an oil reservoir by reversibly precipitating authigenic rock mineral, by: a) providing an oil reservoir system containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral alters floodwater hydrology, thereby increasing oil recovery. In some embodiments, the increase in oil recovery occurs at least 12 days, at least 11 days, at least 10 days, at least 9 days, at least 8 days, at least 7 days, at least 6 days, at least 5 days, at least 4 days, at least 2 days, or less after inducing the authigenic mineral-precipitating bacteria. In other embodiments, oil recovery is increased by at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 100%, at least 200%, at least 300%, at least 400%, at least 500%, or a higher percentage more as compared to the amount of oil recovered from an oil reservoir containing a rock matrix and authigenic mineral-precipitating bacteria, where the bacteria are not contacted with a composition containing an authigenic mineral precursor solution and an authigenic mineral-precipitation inducer. In further embodiments, the authigenic mineral precipitation may be reversed by inducing indigenous and/or exogenously added authigenic mineral-dissolving bacteria with an authigenic mineral-dissolving inducer to remove the floodwater channel plug once the oil recovery begins to decrease. The process of inducing authigenic mineral-precipitating bacteria to precipitate authigenic mineral may then be repeated to alter rock hydrology in a different region of the oil reservoir.

As disclosed herein, authigenic mineral-precipitating bacteria of the present disclosure may be further utilized to create an authigenic mineral barrier in a rock matrix-containing system to, for example, sequester $CO_2$, sequester contaminants, contain contaminant flow, and to form a barrier to create a reaction vessel for underground $CO_2$. Accordingly, some aspects of the present disclosure relate to a method of forming a barrier by reversibly precipitating authigenic rock mineral, by: a) providing a system containing a rock matrix, rock matrix materials, and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, where the precipitated authigenic mineral forms a barrier, and where the barrier reduces the flow of the rock materials through the rock matrix. In some embodiments, the rock materials contain $CO_2$. In other embodiments, the rock materials contain one or more contaminants including, without limitation, radioactive pollution, radioactive waste, heavy metals, halogenated solvents, pesticides, herbicides, and dyes.

In other embodiments authigenic mineral-precipitating bacteria may be utilized to create an authigenic mineral barrier in an aquifer system to prevent contamination of a ground water source or to limit the mobility of contaminating compounds in the aquifer. Thus, other aspects of the present disclosure relate to a method of a method of preventing aquifer contamination by reversibly precipitating authigenic rock mineral, by: a) providing an aquifer containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, thereby preventing aquifer contamination.

Additionally, in embodiments where the authigenic mineral-precipitating bacteria precipitate iron-containing minerals, these bacteria may be utilized to remediate aquifers contaminated by soluble heavy metals, as the precipitated iron-containing mineral can bind to and precipitate the heavy metals from the aquifer. Accordingly, further aspects of the present disclosure relate to a method of remediating a contaminated aquifer by reversibly precipitating authigenic rock mineral, by: a) providing an aquifer containing a rock matrix and authigenic mineral-precipitating bacteria; b) providing a composition containing an authigenic mineral precursor solution and an authigenic mineral-precipitation inducer; and c) contacting the system with the composition under conditions whereby the inducer induces the bacteria to reversibly precipitate authigenic mineral from the solution into the rock matrix, thereby remediating the aquifer contamination.

The following examples are offered to illustrate provided embodiments and are not intended to limit the scope of the invention.

EXAMPLES

Microbial enhanced hydrocarbon recovery (MEHR) takes advantage of various microbial metabolisms to increase hydrocarbon and energy yield by improving oil flow and flood water sweep in a reservoir during tertiary recovery. The Examples herein describe a unique approach to altering rock hydrology and improving floodwater sweep efficiency through the microbial production of authigenic rock mineral precipitants. Many microbial processes are known to be involved in solid-phase mineral precipitation, which can be judiciously applied to homogenize rock matrix porosity with the subsequent alteration and improvement of floodwater sweep. However, to date, there has been little investigation of the applicability of these precipitation events to MEHR strategies. Such processes can be mediated by microorganisms, such as nitrate-dependent Fe(II)-oxidizing bacteria, which can precipitate solid-phase iron minerals from the metabolism of soluble $Fe^{2+}$,[1,2]. These microorganisms are capable of changing the valence state of added soluble ferrous iron [Fe(II)] precipitating out insoluble ferric minerals [Fe(III)] which can result in pore restrictions and reduced pore throat diameter. Alternatively, Fe(II)-oxidizing organisms can oxidize the Fe(II) content of native mineral phase Fe(II) in rock matrices, thus altering the original mineral structure resulting in rock weathering and mineral biogenesis. Previous studies of these microorganisms have indicated their ubiquity and activity in both extreme and moderate environments and many pure culture examples are also available. Additional mechanisms of authigenic mineral precipitation may also include biogenesis of phosphorite minerals, which can occur by stimulating high rates of microbial degradation of organic phosphorous materials liberating soluble, reactive, inorganic phosphates. Such authigenic reactions are known to be important processes in marine environments due to the high concentrations of reactive calcium in marine waters similar to that found in many oil reservoirs. Alternatively, phosphorous and biogenically formed carbon dioxide can react to form apatite minerals such as the carbonate fluoroapatite [Ca10(PO4, CO3)6F2].

Microbial communities are known to mediate iron geochemical cycling in aquatic, terrestrial, and subsurface ecosystems. As the fourth most abundant element in the Earth's crust, iron redox reactions have the potential to exert a significant influence on global geochemistry leading to the mineralization of organic matter, mineral dissolution and weathering, the formation of geologically significant minerals, and the mobilization or immobilization of various anions and cations, which includes contaminants[3,4]. The solubility and reactivity of iron is particularly sensitive to the environmental pH. The solubility of the trivalent ferric form [Fe(III)] is inversely proportional to acid pH values and below a pH value of 4.0 Fe(III) primarily exists as an aqueous ionic $Fe^{3+}$ species[5]. At circumneutral pH, ~pH 7, and greater pH values, such as those commonly found in oil reservoirs, iron primarily exists as insoluble, solid-phase minerals in divalent ferrous [Fe(II)] and trivalent ferric [Fe(III)]oxidation states[4].

Microbially catalyzed redox reactions between the Fe(II) and Fe(III) valence states play a fundamental role in modern environmental biogeochemistry in both the oxic and anoxic zones of aquatic, terrestrial, and subsurface ecosystems from low to elevated pH levels. The role of microbially catalyzed Fe(III) reduction in non-sulfidogenic sedimentary environments at circumneutral pH is well established[6-8]. However, it is only within the past decade that microbial Fe(II) oxidation has been recognized to contribute to iron redox cycling not only in the oxic environment but also in environments devoid of molecular oxygen ($O_2$)[9,10].

Example 1: Iron Redox Cycling at Circumneutral pH: Role of Microbial Fe(II) Oxidation Abiotic Fe(II) Oxidation Transfer of $Fe(II)_{aq}$ across the environmental anoxic/oxic transition zone through diffusion or active transport mechanisms and subsequent rapid abiotic reaction with dissolved $O_2$, has been described as a possible mechanism for re-oxidation of Fe(II) in the natural environment[12]. Anoxic redox processes may also contribute to iron biogeochemical cycling at circumneutral pH through abiotic reactions with oxidized manganese [Mn(IV)][13,14], or oxyanions of nitrogen [nitrate ($NO_3^-$) or nitrite ($NO_2^-$)][5,15-18]. Abiotic reaction of Fe(II) with nitrate may occur through several mechanisms. At high temperatures (75° C.) Fe(II) oxidation coupled to the reduction of nitrate to ammonium ($NH_4^+$) occurs spontaneously[19]. Alternatively, at lower temperatures, the Fe(II) content of highly reactive crystalline mixed valence iron minerals such as green rust will abiotically react with nitrate to form magnetite and ammonia as the sole end-products[17]. The reaction between Fe(II) and nitrate can be enhanced through catalysis by trace metals such as $Cu^{2+}$,[16,20], through surface chemistry reaction on crystalline iron oxide (lepidocrocite and goethite) surfaces at elevated pH (>8.0)[18], or through reaction with Fe(III) oxide precipitates formed during iron silicate dissolution[21]. However, the relatively extreme specific conditions required (i.e., high temperature, high pH, or through reaction with catalysts) for abiotic Fe(II) oxidation coupled to the reduction of $NO_3^-$ indicates that these reactions may not be dominant oxidative mechanisms in typical natural environments. Alternatively, nitrite produced as an intermediate or end-product of organotrophic $NO_3^-$ reduction or nitrification can also chemically oxidize Fe(II)[15]. With the exception of $NO_2^-$, abiotic Fe(II) oxidation reactions by oxidized nitrogen species are considered relatively insignificant under geochemical conditions consistent with typical iron-rich sedimentary environments at circumneutral pH[22,23].

Biological Oxidation of Fe(II)

In contrast to abiotic Fe(II) oxidation, recent studies indicate that biological reactions may significantly contribute to the oxidation of Fe(II) in the environment. Although the quantitative role of aerobic oxidative biological mechanisms has not been established[24,25], recent studies have demonstrated that bacteria in zones of low oxygen tension (i.e., microaerophilic) are capable of competing with abiotic reactions, coupling the oxidation of Fe(II) to aerobic respiration[26-28]. The end-products of these metabolisms generate insoluble poorly crystalline biogenic Fe(III) oxides which precipitate from solution[25,29]. In contrast to the first neutrophilic aerobic iron-oxidizing bacterium, *Gallionella ferruginea*, described over a century ago[30,31], anaerobic bio-oxidation of Fe(II) has only recently been identified and additional research is required to determine the degree of ubiquity and diversity of organisms capable of this metabolism[9,10,32]. The identification of a light-dependent photoautotrophic, anaerobic iron oxidizing bacterium introduced the potential role of microbially catalyzed Fe(II) oxidation in anoxic environments[9]. In the photic zone, Fe(II) oxidizing phototrophic bacteria are capable of oxidizing Fe(II) generating Fe(III) oxides including mixed valence phase minerals such as magnetite[33]. The subsequent identification of nitrate serving as a terminal electron acceptor for light independent iron-oxidizing metabolisms[10] has closed a missing gap in the iron redox cycle. In anoxic environments, microbial oxidation of Fe(II) coupled to the reduction of nitrate, perchlorate, and chlorate has been demonstrated[10,32]. Recent studies determining the true ubiquity and diversity of these anaerobic Fe(II)-oxidizing microorganisms (FOM) suggests that metabolic, light independent reactions, such as nitrate-dependent Fe(II) oxidation, have the potential to contribute to anoxic Fe(II) oxidative processes on a global scale, provided that adequate concentrations of an electron acceptor are readily available[34]. These FOMs are capable of oxidizing solid-phase Fe(II)[23,35-37] as well as Fe(II) associated with structural iron in minerals such as almandine, an iron aluminum silicate[35,38,39], yielding amorphous and crystalline Fe(III) oxide minerals. The formation of these biogenically formed Fe(III) oxides can serve as an electron acceptor for Fe(III)-reducing microorganisms perpetuating a dynamic microbially-mediated Fe iron cycle[40-42] in addition to soil and sediment biogeochemistry, mineralogy, and heavy metal and radionuclide immobilization[23,35,42,43].

Example 2: Iron Mineral Effects on Metal Mobility

Iron (hydr)oxides can be both abiotically and biogenically formed through oxidation of Fe(II) at circumneutral pH. Abiotic oxidation of soluble $Fe(II)_{aq}$ may be mediated through a reaction with an oxidized manganese [Mn(IV)] species or by the diffusion of Fe(II) into an oxic environment subsequently reacting with molecular oxygen ($O_2$). Biological Fe(II) oxidation and formation of iron hydr(oxides) can be indirectly mediated through benthic bioturbation by macrophytes and macrofauna resulting in particle mixing and aeration causing the subsequent oxidation of Fe(II)[44-49]. Alternatively, biogenic iron hydr(oxide) formation can be directly mediated through the activity of either aerobic or anaerobic microorganisms[2]. Microaerophilic Fe(II)-oxidizing bacteria are capable of competing with the abiotic oxidation kinetics between $O_2$ and Fe(II), and couple this metabolism to growth[26,50-53]. Alternatively, anaerobic Fe(II) bio-oxidation by respiratory or phototrophic microorganisms can represent a primary route of biological iron hydr(oxide) formation in many environments[2,9,10,35,36], directly impacting soil and sediment biogeochemistry, mineralogy, and heavy metal and radionuclide immobilization in the absence of oxygen[35,54-56].

Figure 2:
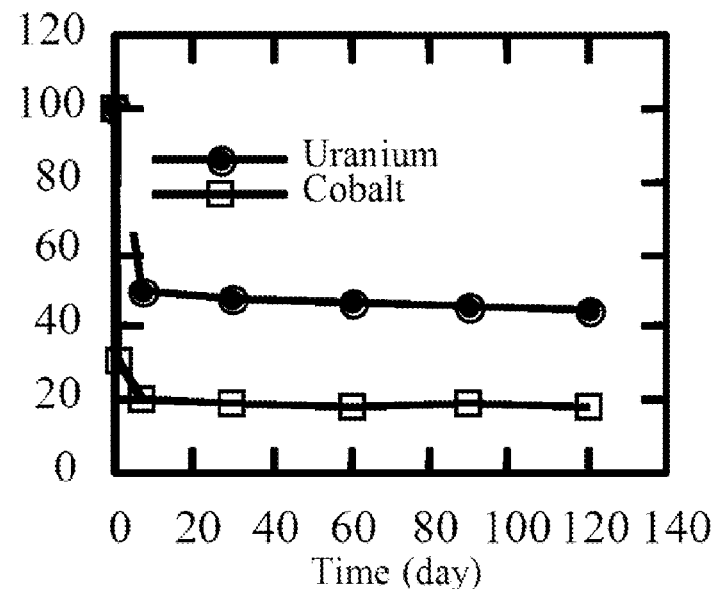
FIG. 2 graphically depicts adsorption and precipitation of uranium and cobalt by Fe(III)-oxides biogenically formed after addition of U(VI) and Co(III) soluble salts

While phototrophic Fe(II) oxidation is likely of importance in environments with suitable light penetration, it may not be prevalent in soils and aquifer systems. In contrast, chemotrophic Fe(II)-oxidizing bacteria have been shown to be ubiquitous in anaerobic soils and sedimentary environment[2,56,57]. These organisms produce a broad range of insoluble iron forms as end-products, including amorphous hydrous Fe(III)-oxides and mixed-valence iron minerals such as green rust, maghemite, and magnetite[2,35,36]. These iron minerals represent a primary sink for heavy metals and metalloids in sedimentary environments and they regulate soluble metal concentrations, including those of uranium, chromium, and cobalt, in natural waters through adsorption and co-precipitation[55,58,59]. Abiotic studies have shown that metals such as cobalt, chromium, cadmium, lead, uranium, and radium are rapidly adsorbed by these iron minerals[55,58,60-62] and some of those metals with lower ionic radii (e.g., $Co^{2+}$, $Cd^{2+}$) are incorporated into the Fe(III)-oxide structure as it crystallizes with age. These metals become tightly bound into the Fe(III)-oxide crystal[58] and are thus permanently immobilized. Our previous studies demonstrated that metals such as cobalt, cadmium, and uranium are also rapidly adsorbed by biogenic iron hydrous oxides produced through the activity of nitrate-dependent Fe(II)-oxidizing bacteria (FIG. 2). In these studies the microorganisms produced mixed valence Fe(II)-Fe(III) minerals that rapidly crystallized with age[55]. In the case of U(VI), it was preferentially bound (>80%) to the most crystalline phase and formed stable insoluble bidentate and tridentate inner sphere complexes[55]. As such, these normally soluble metals become tightly bound into the most stable iron mineral form and are permanently immobilized.

Example 3: Fe(II)-Oxidizing Biogeochemistry

At pH values at or above circumneutral (~pH 7), environmental iron exists primarily as insoluble, solid-phase minerals in the divalent ferrous [Fe(II)] or trivalent ferric [Fe(III)] oxidation states[4]. The solubility of iron increases with decreasing pH values[5], and below pH 4.0 Fe(II) primarily exists as an aqueous species, even in the presence of oxygen. The biogeochemical role of Fe-oxidizing microorganisms in acidic environments has been well established[63]. Similarly, at circumneutral pH, microbial Fe redox cycling can significantly affect the geochemistry of hydromorphic soils and sediments, leading to the formation of geologically significant minerals, mineral weathering, and the immobilization of various anions and cations[4,35,55]. As such, the microbial redox transition between the Fe(II) and Fe(III) valence states is now recognized to play a fundamental role in soil and sedimentary biogeochemistry on a global basis.

While aerobic microbial oxidation of Fe(II) has been recognized for decades, the identification of anaerobic Fe(II) bio-oxidation in 1993 closed a missing gap in the iron redox cycle[2,9,10]. Additionally, it has been demonstrated that anaerobic Fe(II)-oxidizing microorganisms are ubiquitous and have been identified in numerous diverse environments[65]. In addition to its importance in neoteric environments, anaerobic microbial Fe(II) oxidation has been proposed to have evolved as an early respiratory metabolism on Earth, contributing to the precipitation of iron oxide minerals, including maghemite and magnetite, before $O_2$ was available in the Fe(II)-rich Precambrian environment[9,35,66,67]. Various studies have indicated that Fe(II) is generally oxidized to precipitate as insoluble amorphous Fe(III)-oxide by the activity of these microorganisms[36,68,69] which readily ages to form more crystalline species[35,36,55,68,69]. Amorphous Fe(III)-oxide [$Fe_2O_3 \cdot H_2O$(am)], or ferrihydrite, is often used for the study of adsorption of trace metals because it is a uniform material with well known surface properties that is easily reproduced[58]. It is also representative of metal oxides in extant environments and is a precursor to many natural forms of crystalline Fe(III)-oxides such as goethite and hematite[70-72]. Metals such as lead, and radium are rapidly adsorbed by this iron form[55,58,60,61]. Our previous studies have shown that heavy metals and radionuclides are rapidly adsorbed and immobilized by biogenic iron hydrous oxides produced through the activity of Fe(II)-oxidizing bacteria[55].

Example 4: Anaerobic Fe(II)-Oxidizing Microorganisms

The discovery of photoautotrophic, anaerobic Fe(II) oxidation in 1993 was the first demonstration of microbially mediated oxidation of Fe(II) in anoxic environments[9]. The Fe(II)-oxidizing microorganisms involved in this process oxidize soluble Fe(II), utilizing light energy to fix $CO_2$ into biomass. Although the phototrophic Fe(II)-oxidizing microorganisms in the Bacteria domain are phylogenetically diverse, including *Chlorobium ferrooxidans, Rhodovulum robiginosum, Rhodomicrobium vannielii, Thiodiction* sp., *Rhodopseudomonas palustris*, and *Rhodovulum* sp., the significance of their metabolism in natural terrestrial environments is limited by the maximum penetration of light to a depth of 200 mm into soil and sediments[73]. Furthermore, recent studies have indicated that phototrophic Fe(II)-oxidizing microorganisms are unable to promote Fe(II) mineral dissolution and are limited by the mineral solubility[74]. Therefore, the impact of this microbial process on Fe redox cycling, mineral weathering is likely of minor consequence in terrestrial and sedimentary environments.

Figure 3:
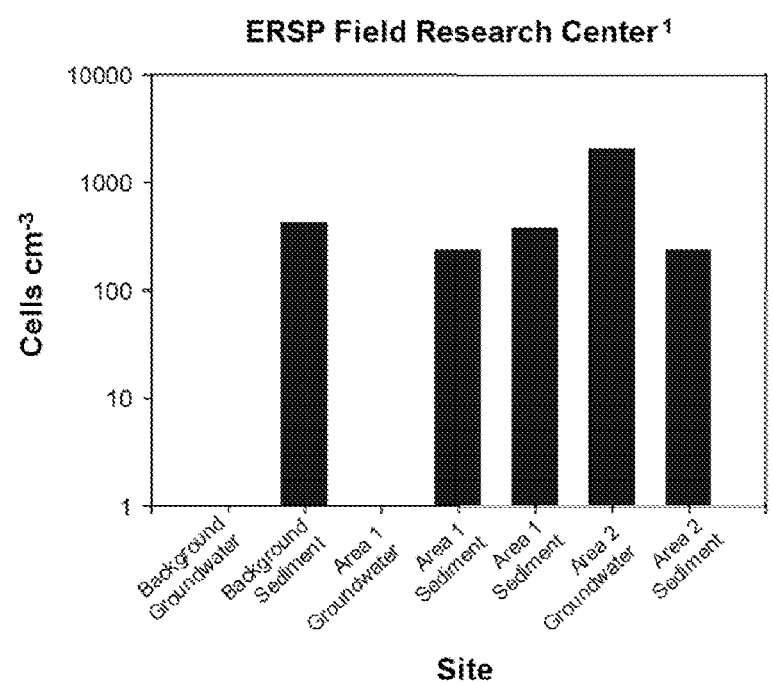
FIG. 3 depicts MPN enumeration of FRC nitrate dependent Fe(II) oxidizers.

In contrast, chemolithotrophic anaerobic Fe(II) oxidation is not limited to environments exposed to light. At circumneutral pH, light-independent microbially mediated oxidation of both soluble and insoluble Fe(II) coupled to nitrate reduction has been demonstrated in a variety of freshwater and saline environmental systems, including paddy soil, pond, stream, ditch, brackish lagoon, lake, wetland, aquifer, hydrothermal, and deep sea sediments[10,35,53,54,56,57,66,75-79]. These environmental systems support abundant nitrate-dependent Fe(II)-oxidizing microbial communities in the order of $1 \times 10^3$ to $5 \times 10^8$ cells/g of sediment[65]. Most probable number (MPN) enumeration studies using subsurface sediments and groundwater samples revealed similar population sizes of anaerobic nitrate-dependent Fe(II)-oxidizing organisms ranging from $0-2.4 \times 10^3$ cells·cm$^{-3}$ (FIG. 3).

MPN enumeration studies were performed by serially diluting 1 g of sediment from each sediment core interval in triplicate in 9 ml anoxic (80:20 N2:CO2 headspace) bicarbonate-buffered (pH 6.8) freshwater basal medium and containing 5 mM nitrate and 0.1 mM acetate as the electron acceptor and the additional carbon source, respectively. Ferrous chloride was added as the electron donor from an anoxic (100% N2 atmosphere), filter sterilized (0.22 μm sterile nylon filter membrane) stock solution (1 M) to achieve a final concentration of 10 mM. Following the addition of 1 g sediment, sodium pyrophosphate (final concentration, 0.1%) was added to the sediment slurry, which was gently shaken at room temperature for 1 h. The sediment slurry was then serially diluted in basal medium prepared as described above. After 8 weeks of incubation in the dark at 30° C., tubes positive for iron oxidation were identified by the presence of a brownish-red or brownish-green precipitate. The Most Probable Number Calculator version 4.05 (Albert J. Klee, Risk Reduction Engineering Laboratory, U.S. Environmental Protection Agency, Cincinnati, Ohio, 1996; freeware available at EPA website) was used to enumerate the nitrate-dependent Fe(II)-oxidizing microbial community and calculate confidence limits.

Anaerobic Fe(II)-oxidizing microorganisms have also been demonstrated to exploit the favorable thermodynamics between $Fe(OH)_3$/Fe(II) and nitrate reduction redox pairs ($NO_3^-$/½$N_2$, $NO_3^-$/$NO_2^-$, $NO_3^-$/$NH_4^+$)[10,57,66,68], as well as perchlorate ($ClO_4^-$/$Cl^-$), and chlorate ($ClO_3^-$/$Cl^-$)[68]. In general, nitrite ($NO_2^-$) and nitrogen gas ($N_2$) are considered the sole end-products of nitrate reduction[10,35,66]. However, this may not always be the case, as it has been recently demonstrated that nitrate-dependent Fe(II) oxidation by the model Fe(III)-reducing organism *Geobacter metallireducens* results in the production of ammonium[56].

Figure 4:
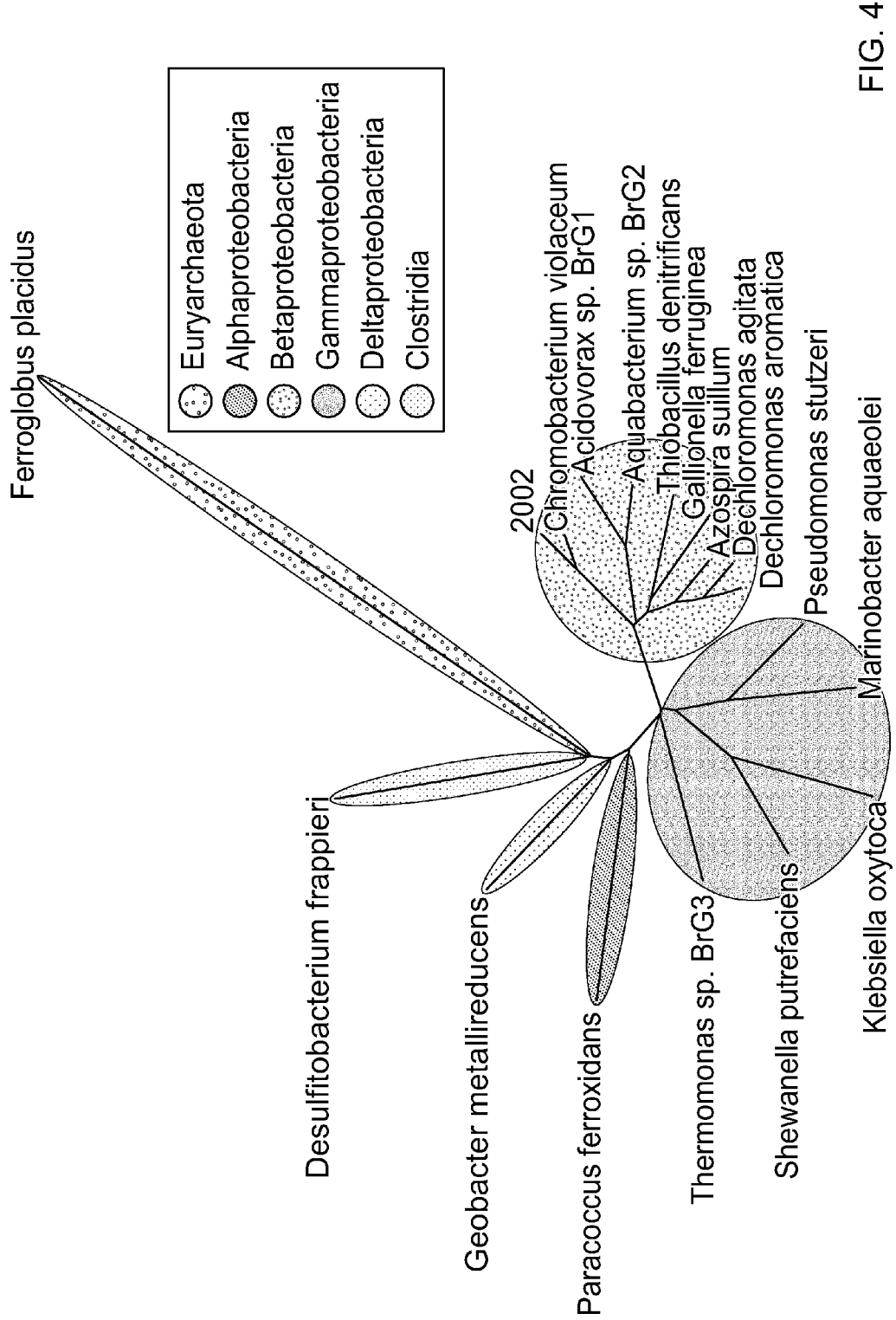
FIG. 4 shows an Unrooted Neighbor-Joining phylogenetic tree of the 16S rRNA gene sequence from nitrate-dependent Fe(II) oxidizing bacteria.

As shown in FIG. 4, nitrate-dependent Fe(II) oxidizing microorganisms are phylogenetically diverse with representatives in both the Archaea and Bacteria. To construct the phylogenetic tree shown in FIG. 4, available quality 16s rRNA gene sequences were aligned with MUSCLE (Edgar, 2004) and phylogeny was computed with MrBayes 3.2 (Ronquist and Huelsenbeck, 2003). The scale bar in FIG. 4 indicates 0.2 changes per position.

These isolates are also physiologically diverse and represent a range of optimal thermal growth conditions from psychrophilic through mesophilic to hyperthermophilic[65]. The ubiquity and diversity of these organisms suggests that nitrate-dependent Fe(II) oxidation represents an important metabolism on a global scale.

Although several environmentally ubiquitous and phylogenetically diverse mesophiles have been described as being capable of nitrate-dependent Fe(II) oxidation[65], in most cases, growth was shown to not be associated with this metabolism or was not demonstrated in the absence of an additional electron donor or organic carbon as an energy source at circumneutral pH[10,35,68,79]. In order to identify additional known mesophiles that can grow by this metabolism, we have developed a simple plate overlay technique to enrich and isolate Fe(II)-oxidizing organisms. In this technique, samples were streaked onto R2A agar plates (Difco catalog no. 218263), an undefined low-nutrient medium, and amended with 10 mM nitrate in an anaerobic glove bag (95:5 N2:H2 atmosphere). The plates were incubated in anaerobic jars at 30° C. for 120 h for heterotrophic colony development. An Fe(II) overlay (5 ml of R2A agar containing 2 mM $FeCl_2$) was poured over each plate following colony development, and incubation took place in an anoxic atmosphere. Colonies that exhibited Fe(II) oxidation, as identified by the development of brownish-red Fe(III) oxide precipitates on or around colonies, were selected and transferred into anoxic bicarbonate-buffered freshwater basal medium containing 10 mM nitrate, 10 mM Fe(II), and 0.1 mM acetate. After 1 week of incubation in the dark at 30° C., positive cultures were transferred into fresh anoxic bicarbonate-buffered basal medium containing 10 mM Fe(II) and 5 mM nitrate with $CO_2$ as the sole carbon source.

Using this plat overlay technique we isolated two novel bacteria *Diaphorobacter* sp. strain TPSY and *Pseudogulbenkiania* sp. strain 2002.

Figure 5:
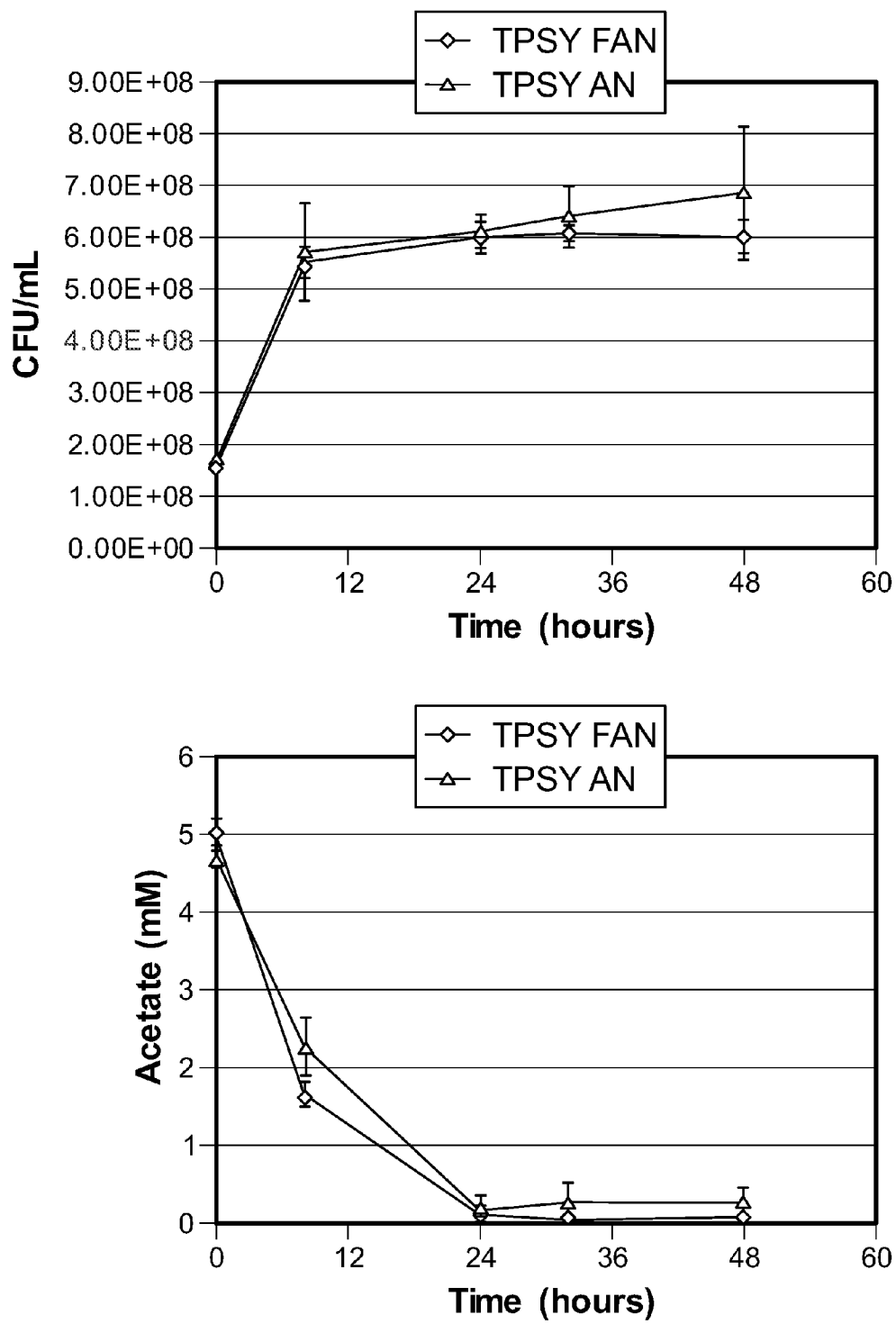
FIG. 5 graphically depicts mixotrophic Fe(II) oxidation coupled to nitrate reduction and growth with acetate by strain TPSY.
Figure 5:
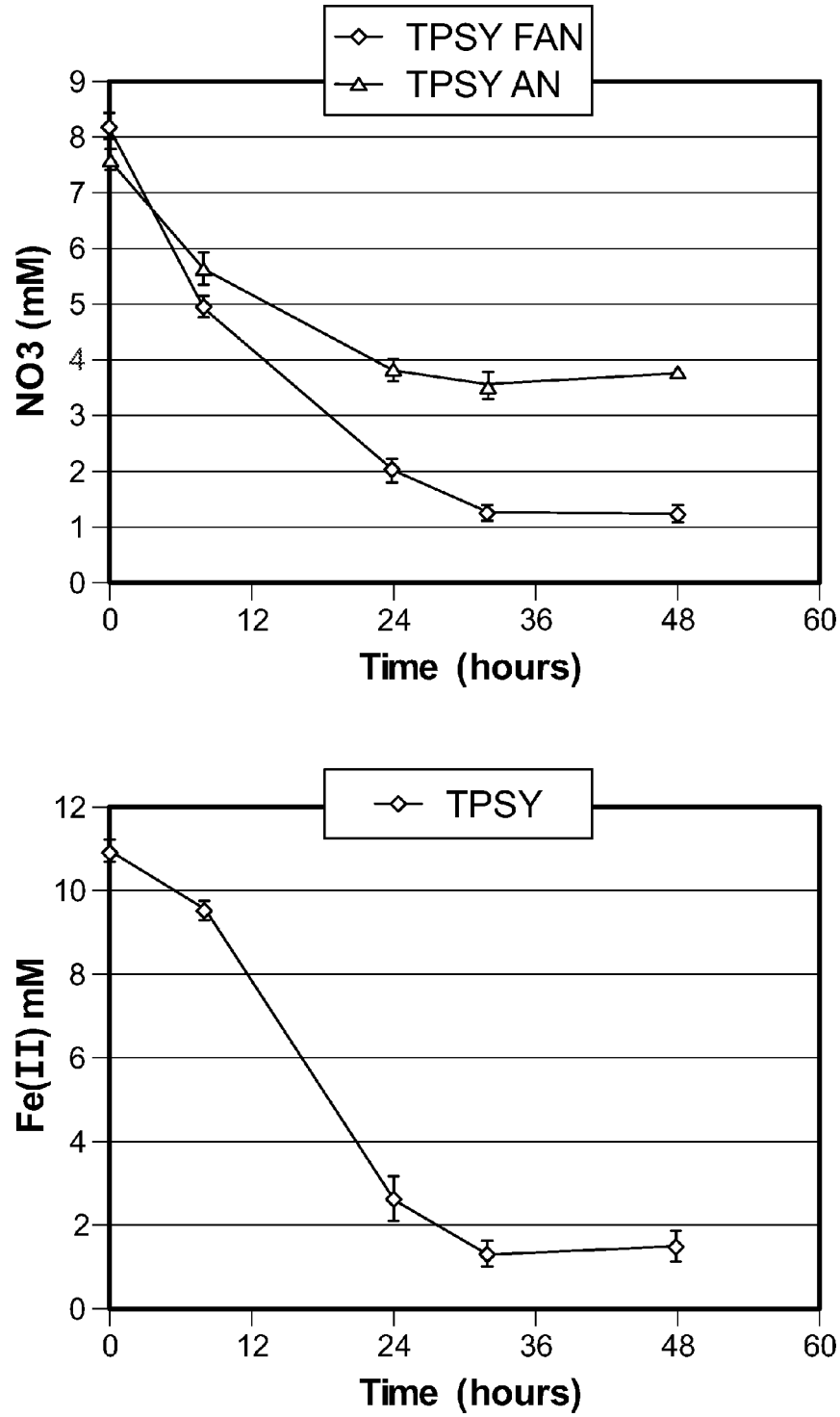

The *Diaphorobacter* sp. TPSY strain is a member of the beta subclass of Proteobacteria, closely related to *Diaphorobacter nitroreducens* in the family Comamonadaceae. Moreover, the *Diaphorobacter* sp. TPSY strain represents the first example of an anaerobic Fe(II)-oxidizer from this family. This organism was shown to grow mixotrophically with Fe(II) as the electron donor, acetate (0.1 mM) as a carbon source and nitrate as the sole electron acceptor (FIG. 5).

The *Pseudogulbenkiania* sp. strain 2002 is a member of the recently described genus, *Pseudogulbenkiania*, in the beta class of Proteobacteria[80]. Its closest fully characterized relative is *Chromobacterium violaceum*, a known HCN-producing pathogen. In contrast to *C. violaceum*, *Pseudogulbenkiania* str. 2002 is non-fermentative and does not produce free cyanide (CN—) or the purple/violet pigments indicative of violacein production, a characteristic of *Chromobacterium* species. Although when tested, *C. violaceum* was able to oxidize Fe(II) coupled to incomplete nitrate reduction (nitrate to nitrite), but was not able to grow by this metabolism[57].

Figure 6:
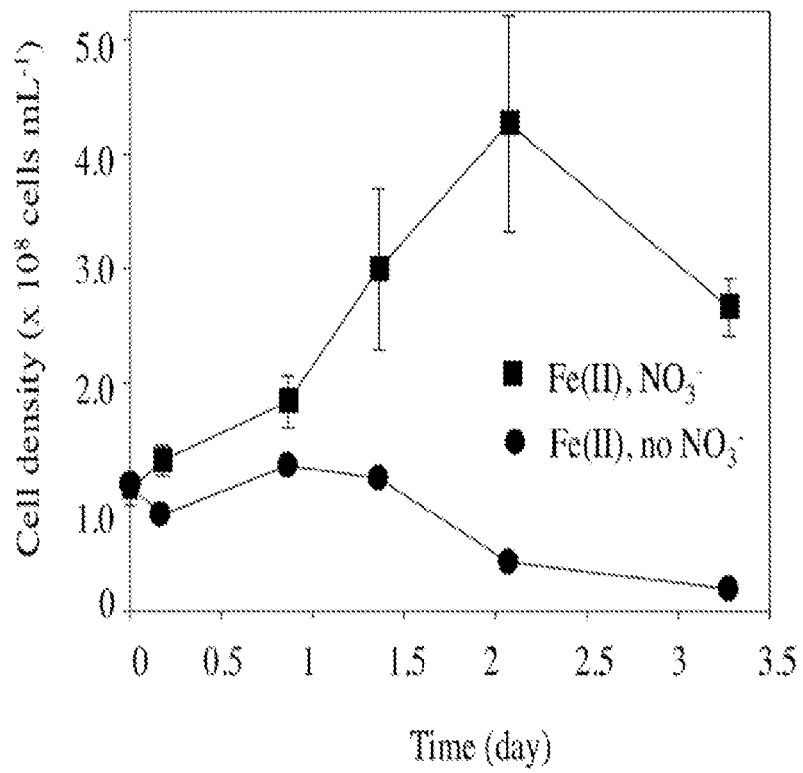
FIG. 6 graphically depicts lithoautotrophic growth by *Pseudogulbenkiania* strain 2002 using Fe(II) and nitrate as the electron donor and acceptor, respectively, and $CO_2$ as the sole carbon source FIG. 7 graphically depicts Fe(II) oxidation by *A. suillum* in anoxic culture medium with acetate as the carbon source and nitrate as the sole electron acceptor. Fe(II) oxidation only occurred after acetate utilization was complete.

In contrast, *Pseudogulbenkiania* str. 2002 was shown to readily grow by nitrate-dependent Fe(II) oxidation (FIG. 6). Furthermore, in addition to its ability to grow mixotrophically on Fe(II) with acetate as a carbon source, *Pseudogulbenkiania* str. 2002 was also capable of lithoautotrophic growth on Fe(II) with $CO_2$ as the sole carbon source (FIG. 6)[57].

Cells of *Pseudogulbenkiania* str. 2002 grown anaerobically on acetate (10 mM) and nitrate (10 mM) were harvested by centrifugation (6,000 g, 10 min), washed twice with anaerobic (100% N2 atmosphere) PIPES [piperazine-N,N'-bis(2-ethanesulfonic acid)] buffer (10 mM, pH 7.0), and resuspended to serve as an inoculum for nongrowth experiments. A washed-cell suspension of *C. violaceum* was prepared with cells grown anaerobically (100% $N_2$ atmosphere) on nutrient broth, glucose (10 mM), and nitrate (5 mM).

The prepared washed-cell suspensions (strain 2002 or *C. violaceum*) were added to anaerobic PIPES (10 mM, pH 7.0) buffer amended with Fe(II) (10 mM) as the sole electron donor and nitrate (4 mM or 2.5 mM) or nitrite (2.5 mM) as the electron acceptor. Heat-killed controls were prepared by pasteurizing (80° C., 10 min) the inoculum in a hot water bath. All cell suspension incubations were performed at 30° C. in the dark, and samples were collected to monitor concentrations of Fe(II), nitrate, and nitrite.

Growth of *Pseudogulbenkiania* str. 2002 under nitrate-dependent Fe(II)-oxidizing conditions was verified in freshwater basal medium containing 10 mM Fe(II) and 2.2 mM nitrate with or without amendment with 0.1 mM acetate. Freshwater basal medium containing 2.2 mM nitrate without an Fe(II) source served as the negative control. Strain 2002 inoculum was grown under heterotrophic nitratereducing conditions in medium stoichiometrically balanced for nitrate (10 mM) and acetate (6.25 mM) in order to eliminate the transfer of reducing equivalents [Fe(II)] into the negative control.

The carbon compound required for growth of *Pseudogulbenkiania* str. 2002 under nitrate-dependent Fe(II)-oxidizing conditions was determined by inoculating an anaerobic, $CO_2$-free (100% $N_2$ atmosphere), PIPES-buffered (20 mM, pH 7.0) culture medium containing 1 mMFe(II)-nitrilotriacetic acid (NTA) and 0.25 mM nitrate with or without a carbon source amendment (1.0 mM $HCO_3^-$ or 0.5 mM acetate). Strain 2002 was grown as described above in anaerobic, PIPES-buffered culture medium. The headspace of the inoculum was aseptically sparged for 15 min with 100% $N_2$ to eliminate $CO_2$ immediately prior to the initiation of the experiment.

The ability of *Pseudogulbenkiania* str. 2002 to assimilate $CO_2$ into biomass was verified by amending the nitrate-dependent Fe(II)-oxidizing growth culture medium (basal freshwater PIPES-buffered medium, 5 mM $FeCl_2$, 2 mM nitrate, 1 mM bicarbonate; 100% He atmosphere) with $H^{14}CO_3^-$ (final concentration, 1 µmol). *Rhodospirillum rubrum* grown photolithoautotrophically under an anoxic atmosphere (50:50 He:$H_2$ atmosphere), served as a positive control culture. Triplicate cultures were incubated statically in the dark for 60 h. A subsample (5 ml) was concentrated to a final volume of 0.5 ml by centrifugation (6,000 g, 10 min). A cell extract was prepared from the concentrated sample by three 30 sec pulses in a bead beater (Mini-Bead-Beater-8; Biospec Products, Bartlesville, Okla.) with 0.1-mm silica beads (Lysing Matrix B, Qhiogene product no. 6911-100). The lysate was chilled in an ice bath for 1 following each pulse. The sample was then centrifuged (10,000 g, 10 min) to remove insoluble cell debris, and the soluble cell extract was withdrawn in order to determine the protein concentration and the $^{14}C$-labeled content.

Replacement of the $N_2$ in the headspace of Fe(II) oxidizing cultures with He did not enhance cell yield. Normalizing change in cell yield per electron transferred, indicated that the cell yield for autotrophic growth ($1.45 \times 10^{-11}$ cells $mL^{-1}$ per electron transferred) was approximately 63% that of mixotrophic (Fe(II)-oxidizing with 0.25 mM acetate as carbon source) growth ($2.3 \times 10^{-11}$ cells $mL^{-1}$ per electron transferred)[57]. To date, autotrophic growth under nitrate-dependent Fe(II)-oxidizing conditions has only been demonstrated in one other organism; a hyperthermophilic archaeon, *Ferroglobus placidus*[66]. As such, *Pseudogulbenkiania* str. 2002 is the first freshwater mesophilic autotrophic nitrate-dependent Fe(II)-oxidizer described in pure culture.

Figure 7:
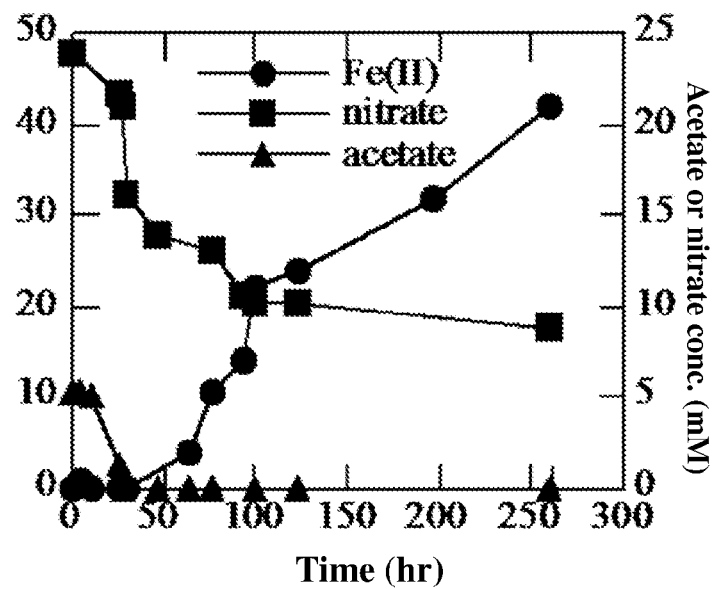

*A. suillum* readily oxidized (10 mM) Fe(II) in the form of $FeCl_2$ with nitrate as the electron acceptor under strict anaerobic conditions (FIG. 7). With 1.0 mM acetate as a cosubstrate, more than 70% of the added iron was oxidized within 7 days. No Fe(II) was oxidized in the absence of cells or if the nitrate was omitted (data not shown). Fe(II) oxidation was initiated after complete mineralization of acetate to $CO_2$, and growth was not associated with this metabolism. Nitrate reduction was concomitant with Fe(II) oxidation throughout the incubation, and the oxidation of 4.2 mM Fen resulted in the reduction of 0.8 mM nitrate, which is 95% of the theoretical stoichiometry of nitrate reduction coupled to Fe(II) oxidation according to the equation.

While *A. suillum* readily oxidized Fe(II) in anoxic growth cultures with nitrate as the electron acceptor and Fe(II) as the sole electron donor, no cell density increase was observed throughout the incubation indicating that the organisms did not grow by this metabolism[35,36]. When acetate was added as an additional carbon and energy source, cell density increased concomitant with acetate oxidation. Fe(II) oxidation occurred after acetate had been depleted and the culture had reached stationary phase (FIG. 7). Nitrate reduction was concomitant with Fe(II) oxidation throughout the incubation (FIG. 7), and the oxidation of 4.2 mM Fe(II) resulted in the reduction of 0.8 mM nitrate, which is 95% of the theoretical stoichiometry of nitrate reduction coupled to Fe(II) oxidation according to Formula (I):

$$10Fe^{2+} + 12H^+ + 2NO_3^- \rightarrow 10Fe^{3+} + N_2 + 6H_2O$$

Although perchlorate and chlorate are not considered naturally abundant compounds, their potential to serve as electron acceptors in environmental systems cannot be discounted[81]. Furthermore, recent evidence suggests that natural perchlorate may be far more prevalent than was first considered, given its recent discovery on Mars. Moreover, the discharge of perchlorate into natural waters has led to widespread anthropogenic contamination throughout the United States[81]. Given the ubiquity of perchlorate-reducing bacteria[81] and the ability of these microorganisms, especially the environmentally dominant *Azospira* sp. and *Dechloromonas* sp.[82], to oxidize Fe(II), anaerobic (per)chlorate-dependent Fe(II) oxidation may impact iron biogeochemical cycling in environments exposed to contaminated waters.

Example 5: Microbial Solid-Phase Fe(II) Oxidation

In contrast to the reaction carried out by phototrophic Fe(II)-oxidizing microorganisms, solid phase Fe(II), including surface-bound Fe(II)[54,56], crystalline Fe(II) minerals (siderite, magnetite, pyrite, arsenopyrite and chromite)[35,54], and structural Fe(II) in nesosilicate (almandine and staurolite)[35] and phyllosilicate (nontronite)[79], are known to be subject to direct nitrate-dependent microbial oxidation. We have previously demonstrated that washed anaerobic whole-cell suspensions of *A. suillum* rapidly oxidized the Fe(II) content in various natural iron minerals, including the silicaceous minerals almandine and staurolite[35] (Table 1).

Both the rate and extent of Fe(II) oxidation was different for the various minerals, which is believed to be due to differences in bioavailability of the Fe(II) in the mineral matrices. No oxidation of Fe(II) was observed in abiotic controls or in the absence of a suitable electron acceptor.

Microbial oxidation of Fe(II) present in different natural iron minerals by anoxic washed whole-cell suspensions of *A. suillum* coupled to the reduction of nitrate

| Mineral | Chemical Formula | Fe(II) oxidized mmol $kg^{-1}$ | percent of total Fe(II) |
|---|---|---|---|
| Almandine | $Fe_3Al_2(SiO_4)3$ | 10.32 | 52.00 |
| Arsenopyrite | FeAsS | 18.27 | 31.00 |
| Chromite | $FeCr_2O_4$ | 9.42 | 95.00 |
| Siderite | $FeCO_3$ | 288.91 | 30.42 |
| Staurolite | $(Fe,Mg,Zn)_2Al_9(Si,Al)_4O_{22}(OH)_2$ | 0.96 | 16.67 |

Although it is known that nitrate-dependent Fe(II)-oxidizing microorganisms have a role in the oxidation of Fe(II) that is structurally incorporated into silicate minerals, as well as contributing to Fe(II) mineral dissolution, additional research is required to fully understand the mineral structure formed and the stability of the residual material. The oxidative transformation of solid phase Fe(II) in an anoxic environment presents an additional mechanism for rock weathering and Fe(III) oxide mineral precipitation in anoxic soils and sediments producing fresh reactive surfaces. To date, a few bio-oxidation products of aqueous Fe(II) and amorphous solid phase Fe(II) have been characterized. A variety of biogenic Fe(III) oxide minerals, including 2-line ferrihydrite[36,75], goethite[56], lepidocrocite, and hematite[35], as well as mixed-phase Fe(II)-Fe(III) minerals, magnetite, maghemite and green rust[35] were identified as oxidation products. As a result of this biogenic formation of magnetite and hematite, nitrate-dependent Fe(II) oxidation has been implicated as having a direct role in the genesis of banded iron formations in Precambrian Earth[35,66].

Example 6: Biochemistry and Genetics of Nitrate-Dependent Fe(II) Oxidation

Figure 8:
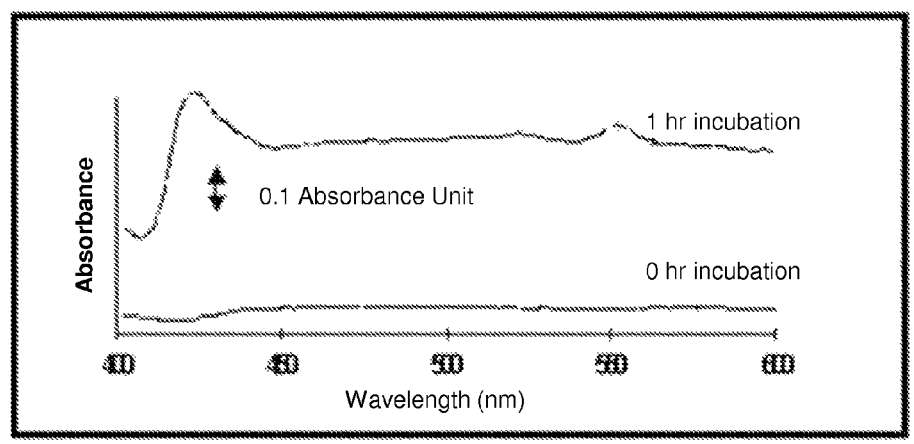
FIG. 8 depicts oxidized minus reduced difference spectra of anaerobic washed cell suspensions in the presence of Fe(II) initially, and after a one hour incubation.

Not much is known regarding the biochemistry or genetic regulation of anaerobic nitrate-dependent Fe(II) oxidation at circumneutral pH. The reduction potential of the possible Fe(III)/Fe(II) redox pairs ranging from −0.314 V to +0.014 V suggests that electrons may be readily donated to the more electropositive Type b, c, or a cytochrome components of an electron transport chain. In support of this, difference spectra studies were performed with known Fe(II)-oxidizing microorganisms (*Dechloromonas aromatica* strain RCB, *D. agitata* strain CKB, *A. suillum* strain PS, *Diaphorobacter* strain TPSY, and *Pseudogulbenkiania* str. 2002), which demonstrated the involvement of type-c cytochrome(s) in the transfer of electrons to chlorate or nitrate respectively under Fe(II)-oxidizing conditions[35,68] (FIG. 8). Type-c cytochromes are common redox active components that are involved in the transfer of electrons in the respiratory electron-transport chain of many organisms. These compounds absorb light differently in the oxidized and reduced state. Subtraction of the absorbance spectrum of the oxidized type-c cytochromes from that of the reduced type-c cytochromes gives characteristic absorbance maxima at 425, 525 and 552 nm. Difference spectra can similarly be performed on whole cells that have been either exposed to $O_2$ (oxidized) or degassed with $H_2$ (reduced). Under anaerobic conditions, reoxidation of the $H_2$-reduced type-c cytochromes of washed whole cells in the presence of physiological electron acceptors such as perchlorate is diagnostic of a role for these cytochromes in the transfer of electrons to this electron acceptor.

The demonstrated capability of some Fe(II)-oxidizing microorganisms to use $CO_2$ as the sole carbon source requires a $CO_2$-fixation pathway. In the case of the archaeon *Ferroglobus placidus* grown on $CO_2$, the reductive acetyl coenzyme A pathway is expressed, implicating its involvement in carbon assimilation[83]. Interestingly, we identified genes associated with the reductive pentose phosphate cycle, RuBisCo, in the finished genome sequence of *Dechloromonas aromatica*[57]. However, autotrophic growth associated with Fe(II) oxidation could not be demonstrated and the conditions under which these genes are expressed were not unidentified. By contrast, PCR amplification using degenerative RuBisCo primers of the genomic DNA from *Pseudogulbenkiania* str. 2002 did not yield a PCR product[57].

Example 7: Fe(II) Oxidation End-Products

Experiments performed with *Pseudogulbenkiania* str. 2002 and *Diaphorobacter* strain TPSY revealed that these organisms produce identical reddish-yellow precipitates typical of amorphous Fe(III) oxyhydroxide under nongrowth nitrate-reducing conditions.

Figure 9:
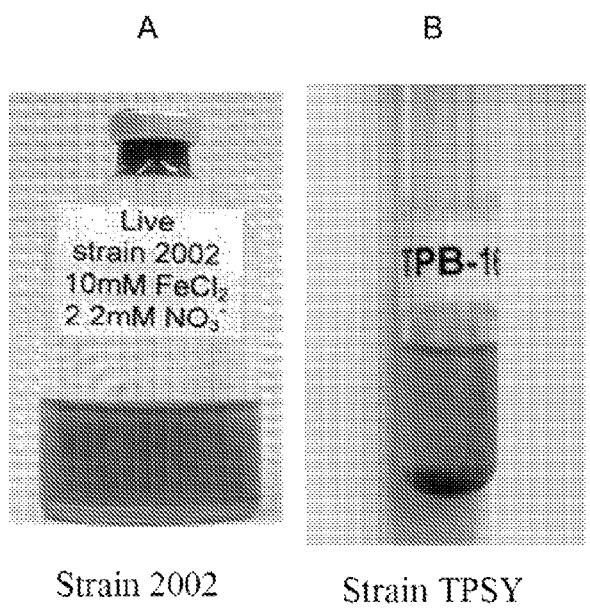
FIG. 9 shows different end-products of Fe(II) oxidation by *Pseudogulbenkiania* strain 2002 and *Diaphorobacter* strain TPSY when grown mixotrophically in identical media under identical conditions with acetate as the carbon source and $FeCl_2$ as the iron form.

Non-intuitively however, mixotrophic growth of these organisms in identical media under identical conditions revealed the production of two significantly different iron end-products (FIG. 9). To determine the iron end-products, the organisms were cultured in anaerobic basal medium with nitrate as the sole electron acceptor and both Fe(II) (added as $FeCl_2$) and acetate as combined electron donors. Under these conditions, both cultures show initial production of greenish-blue mixed valence Fe(II)-Fe(III) hydroxyl salts (Green Rust II) and $PO_4^{3-}$ bearing Fe(II) phases (e.g., vivianite [$Fe_3(PO_4)_2 \cdot 8H_2O$]). However, in the case of *Diaphorobacter* sp. strain TPSY, these initial bluish-green products gradually transform into brownish red precipitates (FIG. 9B). Precipitation of vivianite in the growth culture studies is believed to be due to the presence of 5 mM $NaH_2PO_4$ in the freshwater basal media used for growth cultures.

Figure 10:
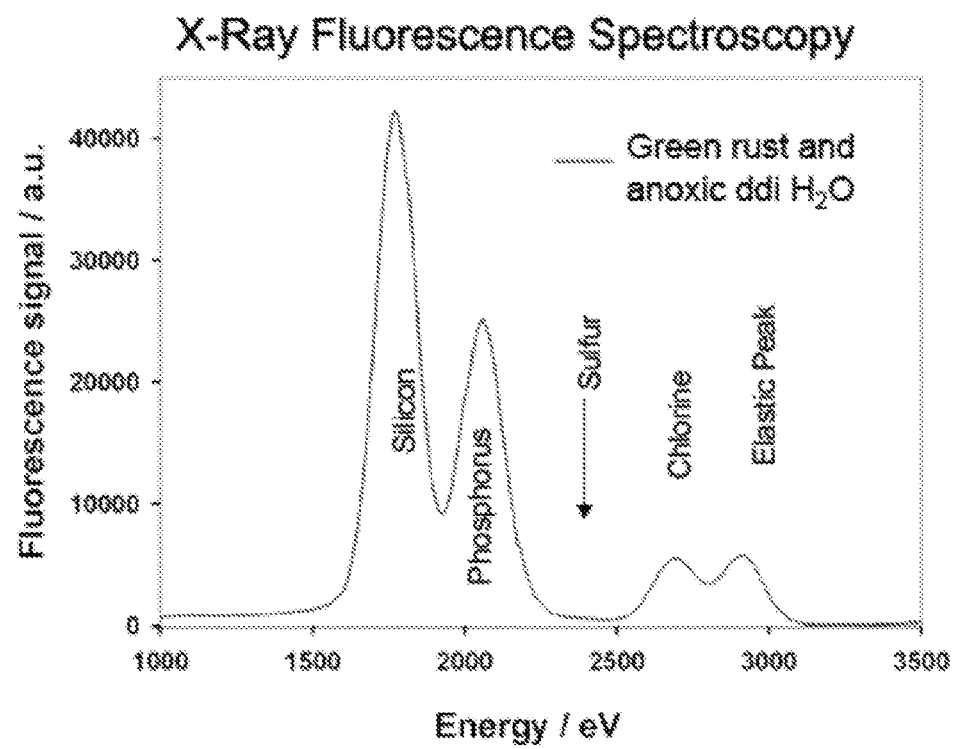
FIG. 10 shows results of X-ray Fluorescence Spectroscopy of mixotrophic growth of *Pseudogulbenkiania* str. 2002.

The three dimensional interlayer anion for the biogenic green rusts may be either $SO_4^{2-}$ or $PO_4^{3-}$, as indicated by previous X-ray powder diffraction (XPRD) studies. However, X-ray Fluorescence Spectroscopy (XRF) analysis (FIG. 10), stoichiometric calculations, and new Mossbauer data suggest that $PO_4^{3-}$ may be the interlayer anion. The combination of Fe(II) and Fe(II)-Fe(III) phases seems to be the thermodynamically stable end product for *Pseudogulbenkiania* str. 2002 growth cultures, as several months of aging revealed no alteration in the precipitate. It remains to be established why the endproducts of Fe(II) oxidation by *Pseudogulbenkiania* str. 2002 are not transformed through the abiotic oxidation of the GR11 phase to more crystalline Fe(III) hydroxides coupled to $NO_2^-/NO_3^-$ reduction, as previously reported[84-87]. This is especially true in light of the fact that highly reactive nitrite is transiently produced by *Pseudogulbenkiania* str. 2002 during heterotrophic and mixotrophic growth under anaerobic nitrate reducing conditions[57,88], which should enable the abiotic transformation of the GRII phase into more crystalline Fe(III) oxyhydroxides over time.

Example 8: Cellular Location of Fe(II) Oxidizing Activity

Figure 11:
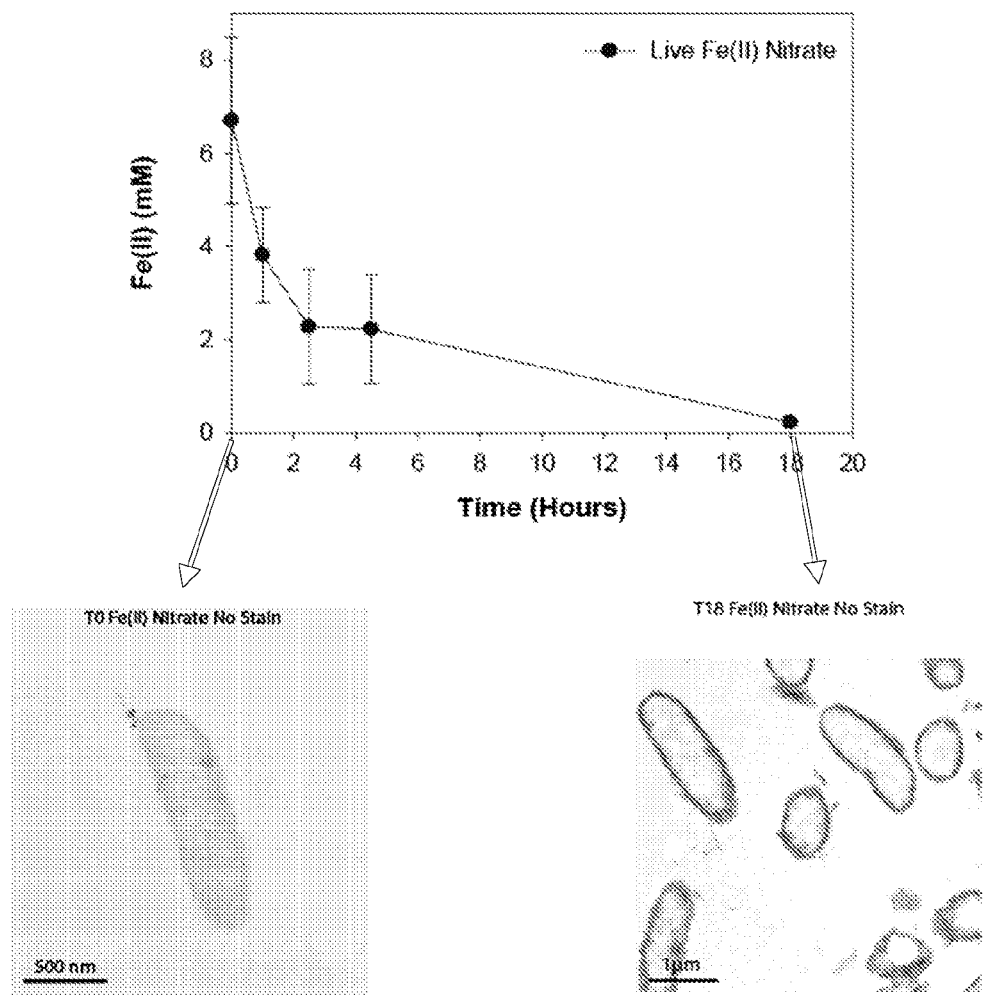
FIG. 11 shows TEM images of cells of *Pseudogulbenkiania* strain 2002 during Fe(II) oxidation. TEM images were performed without straining and indicate the development of an electron dense fraction in the periplasmic space of the gram negative cell.

Our results have indicated that, in contrast to *Diaphorobacter* sp. strain TPSY, growth cultures of *Pseudogulbenkiania* str. 2002 incompletely oxidize the Fe(II) content of the medium regardless of the presence of excess quantities of nitrate or acetate. The extent of oxidation was dependent on the initial Fe(II) concentration and the total number of cells that were present. Furthermore, transmission electron microscopy (TEM) analysis of *Pseudogulbenkiania* str. 2002 during Fe(II) oxidation indicated that the acicular biogenic end-products of soluble Fe(II) oxidation were deposited in the cell periplasm (FIG. 11).

To determine Fe(II) oxidation end-product cell deposition, cells were grown in basal bicarbonate medium with nitrate as the sole electron acceptor. The medium was amended with different amounts of Fe(II) in the form of $FeCl_2$ (1-13 mM) and inoculated with an active culture of *Pseudogulbenkiania* str. 2002. Fe(II) oxidation was monitored temporally under each treatment by ferrozine assay until completion and the extent of Fe(II) oxidation was plotted against initial Fe(II) concentration.

These results indicate that the biogenic minerals produced by *Pseudogulbenkiania* str. 2002 encapsulate the organism by precipitation in the periplasmic space and inhibit further activity. This is in contrast to our findings during similar studies with other Fe(II) oxidizing organisms such as strains PS or TPSY that completely oxidize the Fe(II) content of the medium.

Abiotic reduction of $NO_2^-$ and $NO_3^-$ by Fe(II) sorbed onto the surface of cells and minerals, which act as catalysts, could also lead to the further production of Fe(III) (hydr) oxide minerals on the surface of the cells and could have an additional inhibitory effect on the transport of soluble electron acceptors into the cell as suggested by Coby and Picardal[89]. This may further influence the extent of Fe(II) oxidation and help explain the limited extent of Fe(II) oxidation observed with *Pseudogulbenkiania* str. 2002. These studies suggest that this organism is not evolutionarily adapted to utilize the large amounts of soluble $Fe^{2+}$ used in these studies but may rather be adapted to utilization of insoluble mineral phase Fe(II) at a more controlled rate. Furthermore, it is believed these observations suggest the existence of differences in the mechanisms employed by *Pseudogulbenkiania* str. 2002 and *Diaphorobacter* sp. strain TPSY for exportation of the oxidized end-products of their metabolism.

REFERENCES

1 Lack, J. G. et al. Immobilization of radionuclides and heavy metals through anaerobic bio-oxidation of Fe(II). *Appl. Environ. Microbiol.* 68, 2704-2710 (2002).
2 Weber, K. A., Achenbach, L. A. & Coates, J. D. Microorganisms pumping iron: anaerobic microbial iron oxidation and reduction. *Nat Rev Micro* 4, 752-764 (2006).
3 Stumm, W. & Sulzberger, B. The cycling of iron in natural environments-considerations based on laboratory studies of heterogeneous redox processes. *Geochim. Cosmochim. Acta* 56, 3233-3257 (1992).
4 Cornell, R. M. & Schwertmann, U. *The iron oxides: Structure, properties, reactions, occurrences and uses.* 2 edn, (WILEY-VCH, 2003).
5 Stumm, W. & Morgan, J. J. *Aquatic Chemistry: Chemical Equilibria and Rates in Natural Waters.* 3rd edn, (John Wiley & Sons, 1996).
6 Lovley, D. R. Dissimalatory Metal Reduction. *Annu. Rev. Microbiol.* 47, 263-290 (1993).
7 Nealson, K. H. & Saffarini, D. Iron and Manganese in Anaerobic Respiration: Environmental Significance, Physiology, and Regulation. *Annu. Rev. Microbiol.* 48, 311-348 (1994).
8 Lovley, D. R., Holmes, D. E. & Nevin, K. P. Dissimilatory Fe(III) and Mn(IV) Reduction. *Advances in Microbial Physiology* 49, 219-286 (2004).
9 Widdel, F. et al. Ferrous iron oxidation by anoxygenic phototrophic bacteria. *Nature* 362, 834-836 (1993).
10 Straub, K. L., Benz, M., Schink, B. & Widdel, F. Anaerobic, nitrate-dependent microbial oxidation of ferrous iron. *Appl. Environ. Microbiol.* 62, 1458-1460 (1996).
11 Thamdrup, B. in *Adv. Micro. Ecol. Vol.* 16 (ed Schink B.) 41-84 (Kluwer Academic/Plenum Publishers, 2000).
12 Davison, W. & Seed, G. The kinetics of the oxidation of ferrous iron in synthetic and natural waters. *Geochim. Cosmochim Acta* 47, 67-79 (1983).
13 Einsele, W. Versuch einer Theorie der Dynamik der Mangan und Eisenschichtung in eutrophen See. *Naturwissenschaften* 28, 257-264, 280-285 (1940).
14 Postma, D. Concentration of Mn and Separation from Fe in Sediments—I. Kinetics and Stoichiometry of the Reaction Between Birnessite and Dissolved Fe(II) at 10 C. *Geochim. Cosmochim. Acta* 49, 1023-1033 (1985).
15 Sorensen, J. & Thorling, L. Stimulation by Lepidocrocite (γ-FeOOH) of Fe(II)-dependent nitrite reduction. *Geochimica et Cosmochimica Acta* 55, 1289-1294 (1991).
16 Buresh, R. J. & Moraghan, J. T. Chemical Reduction of Nitrate by Ferrous Iron. *J Environ Qual* 5, 320-325 (1976).
17 Hansen, H. C. B., Koch, C. B., Nancke-Krogh, H., Borggaard, O. K. & Srensen, J. Abiotic Nitrate Reduction to Ammonium: Key Role of Green Rust. *Environmental Science and Technology* 30, 2053-2056 (1996).
18 Ottley, C. J., Davison, W. & Edmunds, W. M. Chemical catalysis of nitrate reduction by iron (II). *Geochimica et Cosmochimica Acta* 61, 1819-1828 (1997).
19 Petersen, H. J. S. Reduction of Nitrate by Iron(II). *Acta Chem Scand A* 33, 795-796 (1979).
20 Van Hecke, K., Van Cleemput, O. & Baert, L. Chemodenitrification of Nitrate-Polluted Water. *Environmental Pollution* 63, 261-274 (1990).
21 Postma, D. Kinetics of Nitrate Reduction by Detrital Fe(II)-silicates. *Geochimica et Cosmochimica Acta* 54, 903-908 (1990).
22 Kluber, H. D. & Conrad, R. Effects of Nitrate, Nitrite, NO and $N_2O$ on Methanogenesis and Other redox Processes in Anoxic Rice Field Soil. *FEMS Microbiol Ecol* 25, 301-318 (1998).
23 Weber, K. A., Picardal, F. W. & Roden, E. E. Microbially Catalyzed Nitrate-Dependent Oxidation of Biogenic Solid-Phase Fe(II) Compounds. *Environmental Science and Technology* 35, 1644-1650 (2001).
24 Emerson, D. & Weiss, J. V. Bacterial iron oxidation in circumneutral freshwater habitats: Findings from the field and the laboratory. *Geomicrobiology J.* 21, 405-414 (2004).
25 Roden, E. E., Sobolev, D., Glazer, B. & Luther, G. W. Potential for Microscale Bacterial Fe Redox Cycling at the Aerobic-Anaerobic Interface. *Geomicrobiology Journal* 21, 379-391 (2004).
26 Emerson, D. & Moyer, C. L. Isolation and characterization of novel iron-oxidizing bacteria that grow at circumneutral pH. *Applied and Environmental Microbiology* 63, 4784-4792 (1997).
27 Edwards, K. J., Rogers, D. R., Wirsen, C. O. & McCollom, T. M. Isolation and Characterization of Novel Psychrophilic, Neutrophilic, Fe-Oxidizing, Chemolithoautotrohic α- and γ-Proteobacteria from the Deep Sea. *Appl Environ Microbiol* 69, 2906-2913 (2003).
28 Sobolev, D. & Roden, E. E. Characterization of a Neutrophilic, Chemolithoautotrophic Fe(II)-Oxidizing β-Proteobacterium from Freshwater Wetland Sediments. *Geomicrobiology Journal* 21, 1-10 (2004).
29 Sobolev, D. & Roden, E. E. Evidence for rapid microscale bacterial redox cycling of iron in circumneutral environments. *Anton van Leeuw* 81, 587-597 (2002).
30 Ehrenberg, C. G. Vorlaufige mitteilungen uber das wirkliche vokommen fossiler infusorien und ihre grosse vergreitung. *Ann. Phys. Chem.* 38 (1836).
31 Winogradsky, S. Eisenbakterien als anorgoxydanten. *Zentralblatt fur Bakteriologie* 57, 1-21 (1922).
32 Bruce, R. A., Achenback, L. A. & Coates, J. D. Reduction of (per)chlorate by a novel organism isolated from paper mill waste. *Environ Microbiol* 1, 319-329 (1999).
33 Jiao, Y. Y. Q., Kappler, A., Croal, L. R. & Newman, D. K. Isolation and characterization of a genetically tractable photo autotrophic Fe(II)-oxidizing bacterium, *Rhodopseudomonas* palustris strain TIE-1. *Appl. Envir. Microbiol.* 71, 4487-4496 (2005).
34 Weber, K. A., Achenbach, L. A. & Coates, J. D. Microbes Pumping Iron: Anaerobic Microbial Iron Oxidation and Reduction. *Nature Microbiology Reviews* (2006).
35 Chaudhuri, S. K., Lack, J. G. & Coates, J. D. Biogenic magnetite formation through anaerobic biooxidation of Fe(II). *Appl. Environ. Microbiol.* 67, 2844-2848 (2001).
36 Lack, J. G., Chaudhuri, S. K., Chakraborty, R., Achenbach, L. A. & Coates, J. D. Anaerobic biooxidation of Fe(II) by Dechlorosoma suillum. *Microb Ecol* 43, 424-431 (2002).
37 Senko, J. M., Dewers, T. A. & Krumholz, L. R. Effect of oxidation rate and Fe(II) state on microbial nitrate-dependent Fe(III) mineral formation. *Appl. Environ. Microbiol.* 71, 7172-7177 (2005).

38 Sheloblina, E. S., VanPraagy, C. G. & Lovley, D. R. Use of Ferric and Ferrous Iron Containing Minerals for Respiration by *Desulfitobacterium frappieri*. *Geomicrobiology Journal* 20, 143-156 (2003).

39 Shelobolina, E., Pickering, S. & Lovely, D. Fe-CYCLE bacteria from industrial clays mined in Georgia, USA. *CLAYS AND CLAY MINERALS* 53, 580-586 (2005).

40 Senn, D. B. & Hemond, H. F. Nitrate controls on iron and arsenic in an urban lake. *Science* 296, 2373-2376 (2002).

41 Straub, K. L., Schonhuber, W., Buchholz-Cleven, B. & Schink, B. Diversity of Ferrous Iron-Oxidizing, Nitrate-Reducing Bacteria and their Involvement in Oxygen-Independent Iron Cycling. *Geomicrobiol. J.* 21, 371-378 (2004).

42 Weber, K. A., Urrutia, M. M., Churchill, P. F., Kukkadapu, R. K. & Roden, E. E. Anaerobic Redox Cycling of Iron by Freshwater Sediment Microorganisms. *Environ Microbiol* 8, 100-113 (2006).

43 Lack, J. G. et al. Immobilization of Radionuclides and Heavy Metals through Anaerobic Bio-Oxidation of Fe(II). *Appl Environ Microbiol* 68, 2704-2710 (2002).

44 Armstrong, W. Oxygen diffusion from the roots of some British bog plants. *Nature* 204, 801-802 (1964).

45 Mendelssohn, I. A., Kleiss, B. A. & Wakeley, J. S. Factors controlling the formation of oxidized root channels—a review. *Wetlands* 15, 37-46 (1995).

46 Kostka, J. E., Roychoudhury, A. & Van Cappellen, P. Rates and controls of anaerobic microbial respiration across spatial and temporal gradients in saltmarsh sediments. *Biogeochemistry* 60, 49-76 (2002).

47 Colmer, T. D. Long-distance transport of gases in plants: a perspective on internal aeration and radial oxygen loss from roots. *Plant Cell Environ.* 26, 17-36 (2003).

48 Ferro, I., Van Nugteren, P., Middelburg, J. J., Herman, P. M. J. & Heip, C. H. R. Effect of macrofauna, oxygen exchange and particle reworking on iron and manganese sediment biogeochemistry: A laboratory experiment. *Vie Miliue* 53, 211-220 (2003).

49 Furukawa, Y., Smith, A. C., Kostka, J. E., Watkins, J. & Alexander, C. R. Quantification of macrobenthic effects on diagenesis using a multicomponent inverse model in salt marsh sediments. *Limnol. Oceanogr.* 49, 2058-2072 (2004).

50 Ghiorse, W. C. Biology of iron-depositing and manganese-depositing bacteria. *Ann. Rev. Microbiol.* 38, 515-550 (1984).

51 Sobolev, D. & Roden, E. E. Suboxic deposition if ferric iron by bacteria in opposing gradients of Fe(II) and oxygen at circumneutral pH. *Appl. Environ. Microbiol.*, 1328-1334 (2001).

52 Neubauer, S. C., Emerson, D. & Megonigal, J. P. Life at the energetic edge: Kinetics of circumneutral iron oxidation by lithotrophic iron-oxidizing bacteria isolated from the wetland-plant rhizosphere. *Appl. Environ. Microbiol.* 68, 3988-3995 (2002).

53 Edwards, K. J., Rogers, D. R., Wirsen, C. O. & McCollom, T. M. Isolation and characterization of novel psychrophilic, neutrophilic, Fe-oxidizing, chemolithoautotrohic α- and γ-Proteobacteria from the deep sea. *Appl. Environ. Microbiol.* 69, 2906-2913 (2003).

54 Weber, K. A., Picardal, F. W. & Roden, E. E. Microbially catalyzed nitrate-dependent oxidation of biogenic solid-phase Fe(II) compounds. *Environ. Sci. Technol.* 35, 1644-1650 (2001).

55 Lack, J. G. Immobilization of radionuclides and heavy metals through anaerobic biooxidation of Fe(II). *Appl. Environ. Microbiol.* 68, 2704-2710 (2002).

56 Weber, K. A., Urrutia, M. M., Churchill, P. F., Kukkadapu, R. K. & Roden, E. E. Anaerobic redox cycling of iron by freshwater sediment microorganisms. *Environ. Microbiol.* 8, 100-113 (2006).

57 Weber, K. A. et al. Anaerobic nitrate-dependent iron(II) bio-oxidation by a novel, lithoautotrophic, Betaproteobacterium, Strain 2002. *Appl. Environ. Microbiol.* 72, 686-694 (2006).

58 Ainsworth, C., Pilon, J., Gassman, P. & Van der Sluys, W. Cobalt, cadmium, and lead sorption to hydrous iron oxide: residence time effect. *Soil Sci Soc Am J* 58, 1615-1623 (1994).

59 Hansel, C. M., La Force, M. J., Fendorf, S. & S., S. Spatial and temporal association of As and Fe species on aquatic plant roots. *Environ Sci Technol.* 36, 1988-1994. (2002).

60 Ames, L., McGarrah, J., Walker, B. & Salter, P. Uranium and radium sorption on amorphous ferric oxyhydroxide. *Chemical Geology* 40, 135-148 (1983).

61 Salomons, W. & Forstner, U. *Metals in the Hydrocycle*. (Springer-Verlag, 1984).

62 Charlet, L. & Manceau, A. X-ray Absorption Spectroscopic Study of the Sorption of Cr(III) at the Oxide-Water Interface. *Journal of colloid and Interface Science* 148, 443-457 (1992).

63 Baker, B. J. & Banfield, J. F. Microbial communities in acid mine drainage. *FEMS Microbiol. Ecol.* 44, 139-152 (2003).

64 Straub, K. L., Schonhuber, W., Buchholz-Cleven, B. & Schink, B. Diversity of ferrous iron-oxidizing, nitrate-reducing bacteria and their involvement in oxygen-independent iron cycling. *Geomicrobiol. J.* 21, 371-378 (2004).

65 Weber, K. A., Achenbach, L. A. & Coates, J. D. Microbes Pumping Iron: Anaerobic Microbial Iron Oxidation and Reduction. *Nature Rev. Microbiol.* (2006).

66 Hafenbradl, D. et al. *Ferroglobus placidus* gen. nov., sp. nov. a novel hyperthermophilic archaeum that oxidizes $Fe^{2+}$ at neutral pH under anoxic conditions. *Arch. Microbiol.* 166, 308-314 (1996).

67 Jiao, Y., Kappler, A., Croal, L. R. & Newman, D. K. Isolation and characterization of a genetically tractable photoautotrophic Fe(II)-oxidizing bacterium, *Rhodopseudomonas palustris* strain TIE-1. *Appl. Environ. Microbiol.* 71 (2005).

68 Bruce, R. A., Achenbach, L. A. & Coates, J. D. Reduction of (per)chlorate by a novel organism isolated from a paper mill waste. *Environ Microbiol* 1, 319-331 (1999).

69 Coates, J. D., Michaelidou, U., O'Connor, S. M., Bruce, R. A. & Achenbach, L. A. in *Perchlorate in the Environment* (ed E. D. Urbansky) 257-270 (Kluwer Academic/Plenum, 2000).

70 Cowan, C. E., Zachara, J. M. & Resch, C. T. Cadmium adsorption on iron oxides in the presence of alkaline-earth elements. *Environ Sci Technol* 25, 437-446 (1991).

71 Schwertmann, U. & Taylor, R. M. in *Minerals in the soil environment* Vol. 1 (eds J. B. Dixon & S. B. Weed) 379-438 (Soil Science Society of America, 1989).

72 Zachara, J. M., Girvin, R. L., Schmidt, R. L. & Resch, C. T. Chromate adsorption on amorphous iron oxyhydroxide in the presence of major groundwater ions. *Environ. Sci. Technol.* 21, 589-594 (1987).

73 Ciania, A., Gossa, K.-U. & Schwarzenbach, R. P. Light penetration in soil and particulate minerals. *Eur. J. Soil Sci.* 0, doi: 10.1111/j.1365-2389.2005.00688.x (2005).

74 Kappler, A. & Newman, D. K. Formation of Fe(III)-minerals by Fe(II)-oxidizing photoautotrophic bacteria. *Geochim. Cosmochim. Acta* 68, 1217-1226 (2004).

75 Straub, K. L. & Buchholz-Cleven, B. E. E. Enumeration and detection of anaerobic ferrous iron-oxidizing, nitrate-reducing bacteria from diverse European sediments. *Appl. Envir. Microbiol.* 64, 4846-4856 (1998).

76 Kluber, H. D. & Conrad, R. Effects of nitrate, nitrite, NO and $N_2O$ on methanogenesis and other redox processes in anoxic rice field soil. *FEMS Microbiol. Ecol.* 25, 301-318 (1998).

77 Ratering, S. & Schnell, S, Nitrate-dependent Iron(II) oxidation in paddy soil. *Environ. Microbiol.* 3, 100-109 (2001).

78 Finneran, K. T., Housewright, M. E. & Lovley, D. R. Multiple influences of nitrate on uranium solubility during bioremediation of uranium-contaminated subsurface sediments. *Environ. Microbiol.* 4, 510-516 (2002).

79 Shelobolina, E. S., VanPraagy, C. G. & Lovley, D. R. Use of ferric and ferrous iron containing minerals for respiration by *Desulfitobacterium frappieri. Geomicrobiol. J.* 20, 143-156 (2003).

80 Weber, K. A. et al. Physiological and taxonomic description of the novel autotrophic, metal oxidizing bacterium, *Pseudogulbenkiania* sp. strain 2002. *Appl. Microbiol. Biotechnol.* (in press) (2009).

81 Coates, J. D. & Achenbach, L. A. Microbial perchlorate reduction: Rocket-fuelled metabolism. *Nature Rev. Microbiol.* 2, 569-580 (2004).

82 Coates, J. D. et al. The ubiquity and diversity of dissimilatory (per)chlorate-reducing bacteria. *Applied and Environmental Microbiology* 65, 5234-5241 (1999).

83 Vorholt, J. A., Hafenbradl, D., Stetter, K. O. & Thauer, R. K. Pathways of autotrophic $CO_2$ fixation and dissimilatory nitrate reduction to $N_2O$ in *Ferroglobus placidus. Arch. Microbiol.* 167, 19-23 (1997).

84 Hansen, H. C. B., Koch, C. B., NanckeKrogh, H., Borggaard, O. K. & Sorensen, J. Abiotic nitrate reduction to ammonium: Key role of green rust. Jun. 30, 2053-2056 (1996).

85 Hansen, H. C. B. & Koch, C. B. Reduction of nitrate to ammonium by sulphate green rust: activation energy and reaction mechanism. March 33, 87-101 (1998).

86 Hansen, H. C. B., Guldberg, S., Erbs, M. & Koch, C. B. Kinetics of nitrate reduction by green rusts-effects of interlayer anion and Fe(II): Fe(III) ratio. January 18, 81-91 (2001).

87 Hansen, H. C. B., Borggaard, O. K. & Sorensen, J. Evaluation of the Free-Energy of Formation of Fe(II)-Fe (III) Hydroxide-Sulfate (Green Rust) and Its Reduction of Nitrite. *Geochimica Et Cosmochimica Acta* 58, 2599-2608 (1994).

88 Prietzel, J., Thieme, J., Eusterhues, K. & Eichert, D. Iron speciation in soils and soil aggregates by synchrotron-based X-ray microspectroscopy (XANES, mu-XANES). *European Journal of Soil Science* 58, 1027-1041 (2007).

89 Coby, A. J. & Picardal, F. W. Inhibition of NO3− and NO2− reduction by microbial Fe(III) reduction: Evidence of a reaction between NO2− and cell surface-bound Fe2+. *Applied and Environmental Microbiology* 71, 5267-5274 (2005).

I claim:

1. A method of reversibly precipitating authigenic rock mineral, the method comprising:
    a) providing an oil reservoir system, wherein the system comprises a rock matrix and indigenous, non-fermentative authigenic mineral-precipitating bacteria; and
    b) contacting the system with an Fe(II) solution and an authigenic mineral-precipitation inducer under conditions whereby the inducer induces the bacteria to reversibly precipitate authigenic Fe(III) mineral from the solution into the rock matrix,
        wherein the Fe(II) solution and the authigenic mineral-precipitation inducer induce the bacteria to reversibly catalyze anaerobic bio-oxidation of Fe(II) that results in the reversible precipitation of the authigenic Fe(III) mineral from the solution,
        and
        wherein the authigenic mineral-precipitation inducer is selected from the group consisting of nitrate, nitrite, perchlorate, and chlorate.

2. The method of claim 1, further comprising the step of injecting water into the contacted oil reservoir system to recover oil, wherein the amount of oil recovered from the contacted oil reservoir system is increased as compared to the amount of oil recovered from a corresponding oil reservoir not contacted with the Fe(II) solution and the authigenic mineral-precipitation inducer.

3. The method of claim 2, wherein the precipitated authigenic Fe(III) mineral plugs high permeability water channels in the rock matrix of said oil reservoir system.

4. The method of claim 2, wherein the precipitated authigenic Fe(III) mineral reduces a drop in water pressure of floodwater in oil recovery.

5. The method of claim 1, wherein the precipitated authigenic Fe(III) mineral alters rock hydrology.

6. The method of claim 1, wherein prior to step a), the authigenic mineral-precipitating bacteria are added to the system.

7. The method of claim 6, wherein the authigenic mineral-precipitating bacteria are selected from the group consisting of iron-oxidizing bacteria, perchlorate-reducing bacteria, chlorate-reducing bacteria, and nitrate-reducing bacteria.

8. The method of claim 7, wherein the authigenic mineral-precipitating bacteria are iron-oxidizing bacteria.

9. The method of claim 6, wherein the authigenic mineral-precipitating bacteria are nitrate-dependent Fe(II)-oxidizing bacteria.

10. The method of claim 1, wherein the authigenic mineral-precipitation inducer is nitrate.

11. The method of claim 1, wherein the ratio of Fe(II) solution to authigenic mineral-precipitation inducer present in the system is 2:1 to 10:1.

12. The method of claim 1, wherein the system further comprises indigenous authigenic mineral-dissolving bacteria.

13. The method of claim 12, wherein the system is contacted with an authigenic mineral-dissolving inducer under conditions whereby the authigenic mineral-dissolving inducer induces the authigenic mineral-dissolving bacteria to dissolve the precipitated authigenic Fe(III) mineral.

14. The method of claim 13, wherein the authigenic mineral-dissolving inducer is selected from the group consisting of phosphate, phosphite, oxygen, $H_2$, acetate, propionate, butyrate, lactate, benzoate, citrate, and hexose.

15. The method of claim 1, wherein the method further comprises adding authigenic mineral-dissolving bacteria to the system.

16. The method of claim 15, wherein the authigenic mineral-dissolving bacteria are selected from the group consisting of iron-reducing bacteria and acid-producing bacteria.

17. The method of claim 15, wherein the authigenic mineral-dissolving bacteria are iron-reducing bacteria.

18. The method of claim 1, wherein the method further comprises adding authigenic mineral-precipitating bacteria to the system.

19. The method of claim 18, wherein the added authigenic mineral-precipitating bacteria are recombinant bacteria.

* * * * *